US010748107B2

(12) United States Patent
Stoman

(10) Patent No.: US 10,748,107 B2
(45) Date of Patent: Aug. 18, 2020

(54) SYSTEMS, METHODS, AND APPARATUSES FOR MANAGING AERIAL DRONE PARCEL TRANSFERS

(71) Applicant: Ingar LLC, Southlake, TX (US)

(72) Inventor: Nicolaas Stoman, Southlake, TX (US)

(73) Assignee: INGAR LLC, Southlake, TX (US)

( * ) Notice: Subject to any disclaimer, the term of this patent is extended or adjusted under 35 U.S.C. 154(b) by 241 days.

(21) Appl. No.: 15/798,949

(22) Filed: Oct. 31, 2017

(65) Prior Publication Data

US 2018/0053139 A1 Feb. 22, 2018

Related U.S. Application Data

(63) Continuation of application No. PCT/US2016/033974, filed on May 24, 2016.

(60) Provisional application No. 62/168,977, filed on Jun. 1, 2015.

(51) Int. Cl.
G05D 1/00 (2006.01)
G06Q 10/08 (2012.01)
G05D 1/06 (2006.01)
B64C 39/02 (2006.01)

(52) U.S. Cl.
CPC ......... *G06Q 10/083* (2013.01); *B64C 39/024* (2013.01); *G05D 1/0676* (2013.01); *B64C 2201/027* (2013.01); *B64C 2201/128* (2013.01); *B64C 2201/18* (2013.01)

(58) Field of Classification Search
CPC .............. G06Q 10/083; B64C 39/024; B64C 2201/128; B64C 2201/027; B64C 2201/18; G05D 1/0676

USPC .................. 701/2, 3, 25; 702/5; 244/190
See application file for complete search history.

(56) References Cited

U.S. PATENT DOCUMENTS

| 5,716,032 A * | 2/1998 | McIngvale | B64C 39/024 244/185 |
| 8,718,940 B2 * | 5/2014 | Davis | G01V 99/00 702/5 |
| 8,972,505 B2 * | 3/2015 | Zheng | H04L 51/36 709/206 |
| 8,989,722 B2 * | 3/2015 | Silver | H04W 64/00 455/417 |
| 10,124,912 B2 * | 11/2018 | Walsh | B64F 1/32 |

(Continued)

*Primary Examiner* — Shardul D Patel
(74) *Attorney, Agent, or Firm* — Leif Robert Sloan

(57) ABSTRACT

An aerial drone parcel delivery/transfer management system includes an aerial drone parcel delivery/transfer management server (ADPTMS) and a plurality of aerial drone landing pads (ADLPs). Each ADLP has a corresponding ADLP address with a unique ADLP identifier (e.g., a manufacturing serial number); most-recently known ADLP geolocation data (e.g., geospatial coordinates); and possibly most-recently known ADLP elevation data. The ADPTMS communicates with order management/fulfillment servers associated with online stores, which communicates with aerial drone parcel delivery/transfer services for dispatching aerial drones to particular ADLPs corresponding to particular ADLP addresses as part of online orders fulfillment. An ADLP presents a machine readable code such as a quick response (QR) code that is captured by an aerial drone and processed to verify the ADLP's identity. An ADLP can output local RF and/or optical guiding signals to aid aerial drone navigation to the ADLP.

18 Claims, 22 Drawing Sheets

(56) References Cited

U.S. PATENT DOCUMENTS

| | | | |
|---|---|---|---|
| 2003/0085997 A1* | 5/2003 | Takagi | G11B 27/031 348/143 |
| 2012/0136576 A1* | 5/2012 | Davis | G01V 99/00 702/5 |
| 2012/0143401 A1* | 6/2012 | Jayadevappa | B62H 3/00 701/2 |
| 2014/0032034 A1* | 1/2014 | Raptopoulos | G08G 5/0069 701/25 |
| 2014/0156760 A1* | 6/2014 | Zheng | H04L 51/36 709/206 |
| 2014/0164126 A1* | 6/2014 | Nicholas | A63F 9/24 705/14.58 |
| 2014/0222248 A1* | 8/2014 | Levien | B64C 39/024 701/2 |
| 2014/0277854 A1* | 9/2014 | Jones | G05D 1/102 701/3 |
| 2014/0316243 A1* | 10/2014 | Niedermeyer | A61B 5/7264 600/408 |
| 2019/0217968 A1* | 7/2019 | Schmidt | B64C 39/024 |

* cited by examiner

| Unique ADLP ID | Current / Most-Recent ADLP GPS Coordinates |

*FIG. 2A* ← 320a

| Unique ADLP ID | Current / Most-Recent ADLP 2-D NAC |

*FIG. 2B* ← 320b

| Unique ADLP ID | Current / Most-Recent ADLP GPS Coordinates | Current / Most-Recent ADLP Elevation / Altitude Data |

*FIG. 2C* ← 320c

| Unique ADLP ID | Current / Most-Recent ADLP 3-D NAC |

| Online Merchant ID |
| --- |
| Online Merchant Contact Information |
| Online Store ID(s) |
| Order Management / Fulfillment Service ID(s) |

FIG. 3D — 344

| Online Store ID |
| --- |
| Online Store Offering Type Data |
| Order Management Fulfillment Server Address(es) |
| Link to Not-Yet-Scheduled Orders |
| Link to Pending Orders |
| Link to Completed Orders |

FIG. 3E — 352

| Order Management / Fulfillment Service ID |
| --- |
| Order Management / Fulfillment Service Contact Information |
| Order Management / Fulfillment Server Address(es) |
| List of Associated Aerial Drone Parcel Delivery Services |
| Aerial Drone Parcel Delivery Service Contact Information |
| List of Associated Online Stores |
| Link to Not-Yet-Scheduled Orders |
| Link to Pending Orders |
| Link to Completed Orders |

SYSTEMS, METHODS, AND APPARATUSES FOR MANAGING AERIAL DRONE PARCEL TRANSFERS

CROSS REFERENCE TO RELATED APPLICATIONS

This application is a bypass continuation of International Application No. PCT/US2016/033974, filed on 24 May 2016, which claims the benefit of U.S. Provisional Patent Application 62/168,977, filed on 1 Jun. 2015.

TECHNICAL FIELD

Aspects of the present disclosure are directed to systems and methods for flexibly or selectively managing aerial drone parcel transfers (including parcel pickups and/or deliveries), for instance, in association with a standardized aerial drone landing platform or pad address format by which aerial drone landing platforms or pads are uniquely identifiable and locatable. Aspects of the present disclosure are additionally directed to particular types of aerial drone landing platform or pad structures, apparatuses, devices, configurations, and capabilities.

BACKGROUND

Aerial drones or unmanned aerial parcel delivery vehicles offer the promise of rapid and consistent automated aerial parcel delivery. However, no comprehensive system that enables widespread or ubiquitous aerial drone parcel delivery currently exists, particularly with respect to orders for products or merchandise placed online across a large number of online merchants or vendors. Furthermore, no standard or standardized technique exists for accurately locating aerial drone landing pads onto or into which parcels can be delivered. Moreover, existing aerial drone landing pads are undesirably limited in their capabilities. A need exists to overcome these problems.

SUMMARY

In accordance with an aspect of the present disclosure, a system for managing aerial drone parcel deliveries and/or or aerial drone parcel transfers includes: a plurality of geographically distributed aerial drone landing pads (ADLPs), each ADLP including a landing surface configured for supporting a parcel receivable or received from and/or a parcel providable or provided to an aerial drone; a control unit corresponding to each ADLP, the control unit configured for data communication with at least one of a computing device external to the ADLP and a set of data communication networks including the Internet; a geolocation unit corresponding to each ADLP, the geolocation unit configured for communication with the control unit and further configured for providing geolocation data indicating at least a two dimensional (2D) geospatial location at which the ADLP and/or the ADLP control unit reside during an ADLP registration procedure; a first network communication unit corresponding to each ADLP, the first network communication unit configured for communication with the ADLP control unit and configured for data communication by way of the set of data communication networks; a database coupled to the set of networks; and an aerial drone parcel transfer management server (ADPTMS) remote from the plurality ADLPs. The ADPTMS includes: a processing unit; a second network communication unit coupled to the processing unit and the set of data communication networks; and a memory coupled to the processing unit and storing program instructions that when executed by the processing unit cause the processing unit to perform portions of the ADLP registration procedure for one or more ADLPs, such as a particular ADLP, including: establishing or confirming data communication with the control unit corresponding to the particular ADLP by way of the set of data networks; receiving geolocation data from the control unit corresponding to the particular ADLP; generating or receiving a unique ADLP address for the particular ADLP, where the unique ADLP address includes a unique identifier corresponding to the particular ADLP and the geolocation data (e.g., 2D or 3D geolocation data) provided by the geolocation unit corresponding to the particular ADLP; and storing in the database an ADLP record corresponding to the particular ADLP, wherein the ADLP record includes the unique ADLP address for the particular ADLP. The ADLP address of a given ADLP can include or be, for instance, a manufacturer serial number or other unique code corresponding to the ADLP, geolocation data corresponding to the ADLP, and elevation data corresponding to the ADLP. The ADLP record corresponding to the particular ADLP can indicate or include additional information, such as a categorical type for the particular ADLP, such as whether the particular ADLP is for private or public use.

The unique identifier corresponding to the particular ADLP can be provided on the particular ADLP, presented by the landing surface of the particular ADLP, or electronically stored within a memory accessible to the control unit corresponding to the particular ADLP. The unique identifier can include or be, for instance, an as-manufactured ADLP serial number. The unique identifier can alternatively be selected or generated by the ADPTMS. The control unit corresponding to the particular ADLP can be configured for directly or indirectly communicating the unique identifier corresponding to the particular ADLP and/or the particular ADLP's geolocation data to the ADPTMS.

The landing surface of the particular ADLP can present a machine readable code thereon (e.g., a quick response (QR) and/or other type of code, which can be carried by an ADLP landing mat or presented on an upwardly/outwardly oriented electronic display device corresponding to the ADLP) that encodes or includes the unique identifier corresponding to the particular ADLP, wherein the machine readable code is capturable by a camera carried by an aerial drone when the aerial drone is in proximity of the particular ADLP (e.g., within 0.1-10 meters of the ADLP, or less than 20-30 meters from the ADLP, or within another distance range relative to which the aerial drone's camera can or can be expected to capture a clear image of the machine readable code).

The ADPTMS memory can further store program instructions that when executed by the processing unit cause the processing unit to perform portions of an ADLP user registration procedure, wherein the system further includes a plurality of user computing devices, each user computing device including hardware and software resources by which a user interacting with the user computing device can become a registered ADLP user authorized to use one or more ADLPs having database records stored in the database, wherein each user computing device is configured to execute an ADLP user management app by which the user computing device communicates with the ADPTMS during the ADLP user registration procedure. During the ADLP registration procedure corresponding to the user interacting with the user computing device, the ADPTMS: establishes or verifies a unique user ID and password corresponding to the user; identifies a set of ADLP address, each ADLP address corresponding to an ADLP that the user is authorized to use and which has an ADLP record in the database; receives user data including user contact information; and stores in the database an ADLP user record including the user ID, the user data, and the set of ADLP addresses.

The system can further include at least one online store and an order management/fulfillment server associated with the at least one online store, wherein the at least one online store or the order management/fulfillment server is configured to communicate with the ADPTMS as part of an online order checkout procedure to associate a selected ADLP address stored within the database with an online order placed by a registered ADLP user, wherein the selected ADLP address corresponds to a selected ADLP that the registered ADLP user is authorized to use for aerial drone parcel delivery or pickup.

At least some ADLPs can include a local guiding signal generation unit; and a set of RF antennas coupled to the local guiding signal generation unit and configured for outputting local RF guiding signals detectable by an aerial drone, and/or a set of optical illumination elements coupled to the local guiding signal generation unit configured for outputting local optical guiding signals (e.g., which can include infrared local optical guiding signals) detectable by the aerial drone.

In accordance with an aspect of the present disclosure, a process is disclosed for managing aerial drone parcel deliveries to and/or transfers between a plurality of geographically distributed aerial drone landing pads (ADLPs), each ADLP providing a landing surface to or from which a parcel can respectively be delivered or picked up by way of an aerial drone, each ADLP having (i) a landing surface configured for supporting a parcel received from and/or a parcel provided to an aerial drone; (ii) a control unit corresponding thereto which is configured for data network communication with at least one of a computing device external to the ADLP and a set of data communication networks including the Internet, (iii) a geolocation unit corresponding to each ADLP, the geolocation unit configured for communication with the control unit and further configured for providing geolocation data indicating at least a two dimensional (2D) geospatial location corresponding to the ADLP and/or the ADLP control unit; and (iv) a first network communication unit corresponding thereto, which is configured for communication with the ADLP control unit and configured for data communication by way of the Internet. The process can include: providing an aerial drone parcel delivery and/or transfer management server (ADPTMS), the ADPTMS including: a processing unit; a network communication unit coupled to the processing unit and the set of data communication networks; and a memory coupled to the processing unit and storing program instructions that when executed by the processing unit cause the processing unit to perform portions of the ADLP registration procedure for each ADLP; performing for each ADLP an ADLP registration procedure by way of the ADPTMS, the ADLP registration procedure including: generating or receiving a unique ADLP address for the ADLP, the ADLP address including a unique identifier corresponding to the ADLP and first geolocation data corresponding to a geospatial location at which the ADLP or the ADLP control unit reside during the ADLP registration procedure; and storing in the database an ADLP record corresponding to the ADLP, wherein the ADLP record includes the unique ADLP address for the ADLP.

The process can further include performing for each ADLP an ADLP owner registration procedure including: establishing or verifying communication between the ADPTMS and an ADLP owner computing device; establishing or verifying a unique ADLP owner identifier (ID) and password; receiving ADLP owner data including ADLP owner contact information; and storing the ADLP owner data in the ADLP record.

The process can also include performing for each of a plurality of ADLP users an ADLP user registration procedure including: establishing or verifying communication between the ADPTMS and a user computing device; establishing or verifying a unique ADLP user ID and password; receiving ADLP user indication or selection identifying a set of ADLPs that the ADLP user is authorized to use; receiving ADLP user data including ADLP user contact information; storing in the database an ADLP user record corresponding to the ADLP user, wherein the ADLP user record includes the ADLP user data and the ADLP address of each ADLP within the set of ADLPs. The process can also include verifying that an ADLP user is authorized to use a specified ADLP within the set of ADLPs by way of communication between the ADPTMS and the ADLP owner corresponding to the specified ADLP.

The process can additionally include: establishing communication between the ADPTMS and an online store or an order management/fulfillment server configured for processing orders corresponding to the online store; during a checkout procedure corresponding to an online order placed by a first ADLP user with the online store, receiving from the online store or the order management/fulfillment server first order details corresponding to the online order including an ADLP user ID corresponding to the first ADLP user; communicating ADLP data from the ADPTMS to the online store or the order management/fulfillment server, the ADLP data identifying at least one ADLP having an ADLP record in the database that the first ADLP user is authorized to use; communicating from the online store or the order management/fulfillment server to the ADPTMS second order details corresponding to the online order, the second order details indicating a selected ADLP having an ADLP record in the database that the first ADLP user is authorized to use and to which aerial drone parcel delivery or from which aerial drone parcel pickup is or is planned to occur as part of fulfillment of the online order; and communicating a pending aerial drone parcel delivery or pickup date and time corresponding to fulfillment of the online order to the control unit corresponding to the selected ADLP.

The process can also include outputting at the selected ADLP local guiding signals including at least one of local RF guiding signals and local optical guiding signals (e.g., visible and/or infrared wavelength optical signals) during a time interval corresponding to the pending parcel delivery or pickup date and time.

The process can include: dispatching an aerial drone to an expected geospatial location of the selected ADLP as part of fulfilling the online order; navigating the aerial drone to proximate to the expected geospatial location, for instance, within 0.1-10 meters or less than 20-30 meters of the expected geospatial location, or within another distance range based upon the capabilities of an image capture device carried by the aerial drone's; capturing using the aerial drone's image capture device one or more images of at least one machine readable code (e.g., a QR code that encodes or includes the unique identifier corresponding to the first ADLP) provided by a first ADLP closest to the expected geospatial location; processing the image(s) of the machine readable code(s) to verify whether the first ADLP is the selected ADLP at which aerial drone parcel delivery or pickup is to occur for the online order. For instance, the process can include communicating the captured image of the machine readable code to the ADPTMS; extracting from the captured image of the machine readable code the unique identifier corresponding to the first ADLP; determining the ADLP address of the first ADLP using the extracted unique identifier corresponding to the first ADLP; determining whether the ADLP address of the first ADLP matches the ADLP address of the selected ADLP; and communicating a notification to the aerial drone service provider or the aerial drone indicating whether the first ADLP is the selected ADLP.

The process can also include: navigating an aerial drone to the selected ADLP as part of fulfilling the online order; and directly or indirectly communicating elevation data or an elevation reading (e.g., as obtained or generated by an altimeter carried by the aerial drone) from the aerial drone to the selected ADLP and/or the ADPTMS in association with aerial drone parcel delivery to or pickup from the selected ADLP.

In accordance with an embodiment of the present disclosure, an ADLP includes: a landing surface configured for supporting a parcel receivable or received from and/or a parcel providable or provided to an aerial drone; a control unit corresponding to the ADLP, the control unit configured for data communication with at least one of a computing device external to the ADLP and a set of data communication networks including the Internet; a geolocation unit corresponding to the ADLP, the geolocation unit configured for communication with the control unit and further configured for providing geolocation data indicating at least a two dimensional (2D) geospatial location at which the ADLP and/or the ADLP control unit reside during an ADLP registration procedure; a first network communication unit corresponding to the ADLP, the first network communication unit configured for communication with the ADLP control unit and configured for data communication by way of the Internet; and a machine readable code (e.g., a QR and/or other type of code) presented on or by the ADLP in an upward and/or outward direction, and which is capturable by an image capture device carried by an aerial drone in proximity to the ADLP. The machine readable code can be built into the ADLP's landing surface and/or presented by an electronic display device carried by the ADLP.

The ADLP can further include: a local guiding signal generation unit; and a set of RF antennas coupled to the local guiding signal generation unit and configured for outputting local RF guiding signals detectable by an aerial drone, and/or a set of optical illumination elements coupled to the local guiding signal generation unit configured for outputting local optical guiding signals (e.g., visible and/or infrared wavelength optical signals) detectable by the aerial drone.

BRIEF DESCRIPTION OF THE DRAWINGS

FIGS. 2A-2D are block diagrams showing representative types of uniform or standardized address formats by which aerial drone landing platforms or pads (ADLPs) can be uniquely identified and accurately located in accordance with an embodiment of the present disclosure.

FIGS. 3C and 3D are block diagram showing a representative online merchant registry record and a representative online store registry record within an online merchant/store registry in accordance with an embodiment of the present disclosure.

FIG. 3E is a block diagram showing a representative order management/fulfillment service registry record within an order management/fulfillment service registry in accordance with an embodiment of the present disclosure.

DETAILED DESCRIPTION

Figure 1A:
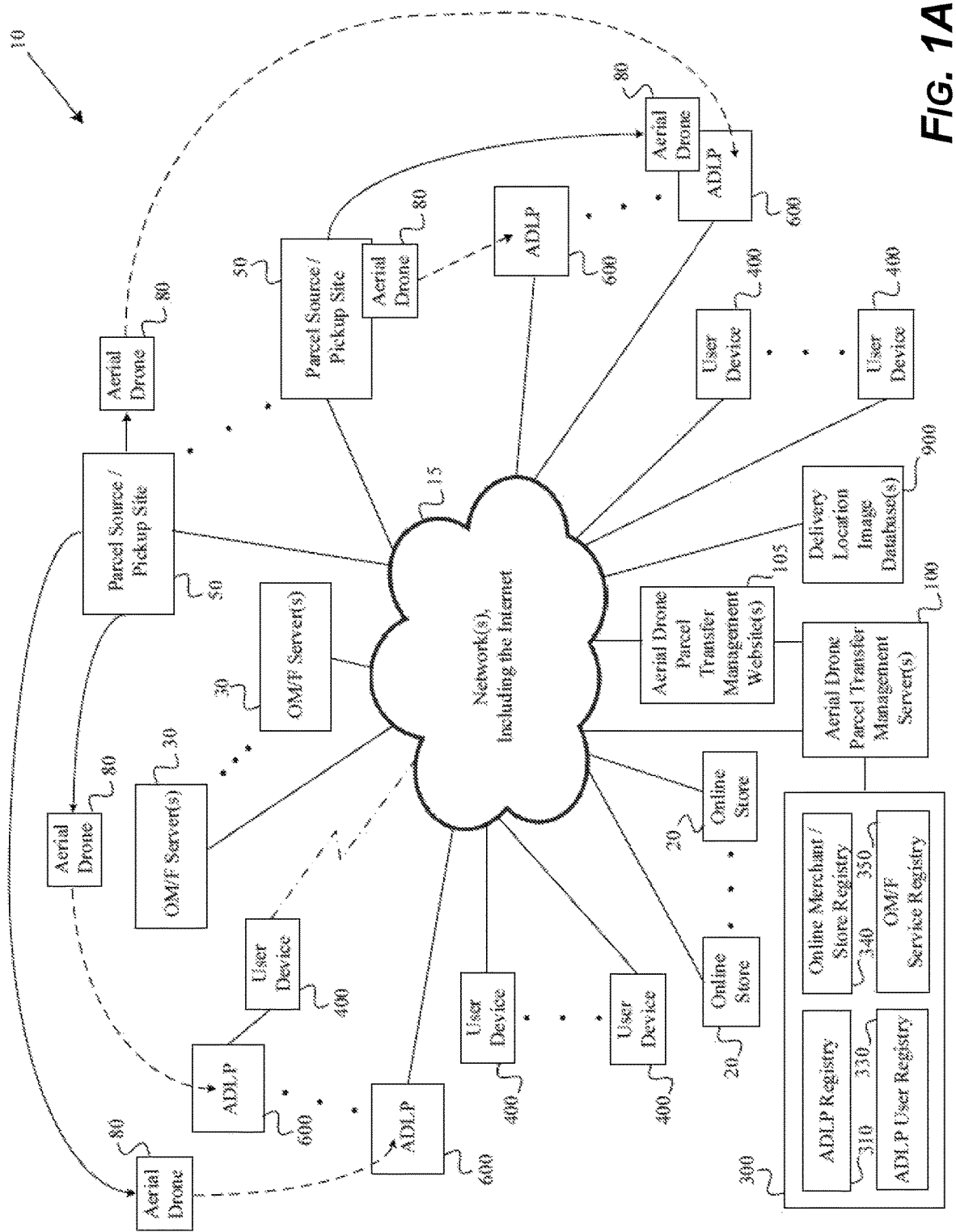
FIG. 1A is a schematic illustration of a networked computer system for managing aerial drone parcel deliveries in accordance with an embodiment of the present disclosure.

In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated. The recitation of a particular numerical value or value range herein is understood to include or be a recitation of an approximate numerical value or value range.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)). In general, an element of a set can include or be a system, an apparatus, a device, a structure, an object, a process, a physical parameter, or a value depending upon the type of set under consideration.

Herein, an "aerial drone" can be defined as an unmanned aerial vehicle (UAV) configured or configurable for (a) airborne delivery of a parcel or package to a landing pad structure, apparatus, or device (hereafter "aerial drone landing pad" or "landing pad") at, on, or in which the aerial drone can securely deposit, release, or leave the parcel; and/or (b) airborne retrieval or pickup of a parcel or package from a surface, structure, apparatus, or device, which can be an aerial drone landing pad. In various portions of the description herein, the term "aerial drone" as used herein can be construed or defined as an unmanned aerial or airborne parcel delivery vehicle. In various embodiments, the term "aerial drone" can additionally or alternatively be construed or defined as an unmanned aerial or airborne parcel pickup or retrieval vehicle, in a manner readily understood by an individual having ordinary skill in the art in view of the description herein.

Overview

Various embodiments in accordance with the present disclosure are directed to computerized or automated systems, apparatuses, devices, processes, and procedures for flexibly or selectively managing aerial drone parcel transfers including parcel deliveries to one or more categorical types of aerial drone landing pads, and possibly aerial drone parcel pickups from such aerial drone landing pads. In multiple embodiments, such categorical types of aerial drone landing pads can include one or more of the following: Private—Single Residence Use; Shared—Multi-Residence Use; Private—Single Business/Corporate Use; Shared—Multi-Business/Corporate Use; Public—Post Office Use; Public—Shipping/Receiving Business Use; and Private—Other Government Agency Use. Additional or other categorical types can be defined in other embodiments. For purpose of brevity and to aid understanding, various portions of the description hereafter are primarily directed to the aerial drone delivery of parcels containing merchandise, products, or goods corresponding to online orders therefor.

Several embodiments in accordance with the present disclosure include or operate in association with a networked computer system by which a registered or authorized user can (a) define, specify, select, input, manage, and/or modify a set of aerial drone landing pad addresses that correspond to or define one or more target parcel delivery destinations at which the user is authorized to receive aerial drone parcel deliveries; (b) electronically place orders with online businesses or merchants and indicate or select a particular aerial drone landing pad address at which a parcel delivery corresponding to an order placed by the user is to occur; (c) prior to parcel delivery, possibly modify an aerial drone landing pad address at which an aerial drone parcel delivery corresponding to such order is to occur; and (d) receive one or more types of messages, notifications, or confirmations relating to aerial drone parcel deliveries.

Moreover, some embodiments in accordance with the present disclosure include or operate in association with a networked computer system by which a registered or authorized user can (a) define, specify, select, input, manage, and/or modify a set of aerial drone parcel pickup sites that correspond to or define one or more parcel pickup locations at which the registered user is authorized to provide or supply parcels for aerial drone pickup; (b) electronically place orders with online businesses or merchants that provide aerial drone parcel transfer services, and indicate or select a particular aerial drone parcel pickup site, such as a specific aerial drone landing pad address at which an aerial drone parcel pickup corresponding to an order placed by the user is to occur; (c) prior to aerial drone parcel pickup, possibly modify an aerial drone parcel pickup site selection, such as an aerial drone landing pad address, at which a parcel pickup corresponding to such order is to occur; and (d) receive one or more types of messages, notifications, or confirmations relating to aerial drone parcel pickups.

For any given aerial drone landing pad that is selectable by or associated or linked with a system in accordance with an embodiment of the present disclosure, its corresponding aerial drone landing pad address identifies or indicates the aerial drone landing pad's current or most-recent physical location, including at least a two-dimensional (2D) location or 2D coordinates, and possibly a three-dimensional (3D) location or 3D coordinates. For instance, a particular aerial drone landing pad address can indicate the aerial drone landing pad's current or most-recent ground-level geospatial location as defined by Global Positioning Satellite (GPS) or similar/analogous/mathematically equivalent coordinates; and can possibly further indicate the aerial drone landing pad's current or most-recent elevation or altitude (e.g., as determined in association with a set of GPS and/or altimeter measurements). Multiple embodiments in accordance with the present disclosure support or operate in association with a uniform or standardized aerial drone delivery/landing pad address format, as further detailed below.

In some embodiments, a given aerial drone landing pad address can be associated or linked with additional or other information by which the specific aerial drone landing pad corresponding to the aerial drone landing pad address can be physically located for parcel delivery thereto or thereon, and/or parcel pickup therefrom. Such additional/other information can include a compass heading or reading associated with the aerial drone landing pad's geolocation (e.g., corresponding to an orientation or approach path by which the aerial drone landing pad is known to be accessible), and/or image data corresponding to one or more objects or structures in the aerial drone landing pad's immediate or surrounding environment (e.g., a set of images corresponding to a building or portions thereof at which an aerial drone landing pad under consideration is physically located), as also detailed below.

In addition or as an alternative to the foregoing, several embodiments in accordance with the present disclosure are directed to particular types of aerial drone landing pad structures, apparatuses, devices, configurations, and capabilities, including aerial drone landing pads suitable for deployment on multi-story or high-rise buildings (e.g., multi-story or high-rise condominium or apartment buildings, office towers, and/or other types of modern buildings). Aerial drone landing pads in accordance with embodiments of the present disclosure are configured for aiding or enabling precise aerial drone navigation to an aerial drone landing pad surface onto or into which an aerial drone can deliver or deposit a parcel.

Aspects of Representative Aerial Drone Parcel Delivery Management Systems

FIG. 1A is a schematic illustration of a networked computer system 10 for managing aerial drone parcel transfers, including parcel pickups and/or deliveries, in accordance with an embodiment of the present disclosure, where at least some of such aerial drone parcel transfers can involve aerial drone landing pads (ADLPs) 600 designed in accordance with an embodiment of the present disclosure, as further detailed below.

In various embodiments, the system 10 includes a plurality of websites or online stores 20 from which goods, products, and/or object transfer services (e.g., including aerial drone parcel transfer services) can be selected, ordered, or purchased. The online stores 20 can correspond to one or more types of organizations or entities, for instance, one or more types of online businesses, merchants, vendors, sellers, corporate divisions or departments, or governmental or intergovernmental agency departments, depending upon embodiment details, which can be referred to hereafter as online merchants for purpose of brevity. The online stores 20 can correspond to or be associated with various types of for-profit and/or non-profit organizations from which goods, products, and/or object transfer services can be sourced or provided, and can facilitate aerial drone parcel transfers corresponding to one or more types of electronic commerce (e-commerce) transactions, such as business to consumer (B2C), business to business (B2B), business to employee (B2E), business to government (B2G), government to business (G2B), government to government (G2G), government to citizen/consumer (G2C), government to employee (G2E), consumer to business (C2B), consumer to consumer (C2C), citizen/consumer to government (C2G), and/or other types of e-commerce transactions (e.g., intergovernmental or extra-governmental organization or non-profit organization to business transactions). Thus, in accordance with embodiment details, particular embodiments in accordance with the present disclosure can facilitate or enable the flexible or selective management of aerial drone parcel transfers corresponding to one or more of such types of e-commerce transactions.

Electronic/computing devices 400 corresponding to system users can communicate with one or more online stores 20 for placing online selections or orders for goods, products, and/or object transfer services presented or offered by way of the online stores 20. An electronic/computing device 400 can include or be, for instance, a desktop computer, a laptop computer, a tablet computer, a phablet, a mobile telephone, and/or other type of smart device (e.g., a smart watch) having hardware resources and software resources or program instruction sets. Such hardware and software resources include a memory; at least one processing unit (e.g., a microprocessor, microcontroller, or similar type of device) capable of executing memory-resident program instructions; an operating system; application program or app (e.g., mobile app) resources (for instance, a web browser); a network communication unit configured for communication with one or more types of computer networks including the Internet 15; and possibly other hardware and/or software resources (e.g., a geolocation unit, a near-field communication (NFC) unit, a cellular network communication unit and a corresponding Subscriber Identity Module (SIM) card, and/or possibly an altimeter unit) depending upon the type of electronic/computing device 400 under consideration, in a manner readily understood by individuals having ordinary skill in the relevant art.

The online stores 20 can communicate with order management/order fulfillment (OM/F) servers 30 corresponding to order management/fulfillment services by way of the Internet 15 and possibly one or more other types of data communication networks (e.g., one or more mobile or cellular data communication networks, a local area network (LAN), a wide area network (WAN), and/or other network), in manner readily understood by individuals having ordinary skill in the relevant art. Any given order management/fulfillment server 30 can provide order management and fulfillment services for one or more online merchants, in a manner also readily understood by individuals having ordinary skill in the relevant art. The order management/fulfillment servers 30 can communicate with one or more aerial drone service providers and/or entities, organizations, and/or devices (e.g., electronic or computing devices) corresponding to parcel sources or pickup sites 50 (e.g., automated or semi-automated product warehouses/distribution centers), such that (a) products identified or specified in online orders can be sourced and dispatched, and/or (b) aerial drone parcel transfer services identified or specified in online orders can be performed for order fulfillment purposes, as further readily understood by individuals having ordinary skill in the relevant art.

Figure 1B:
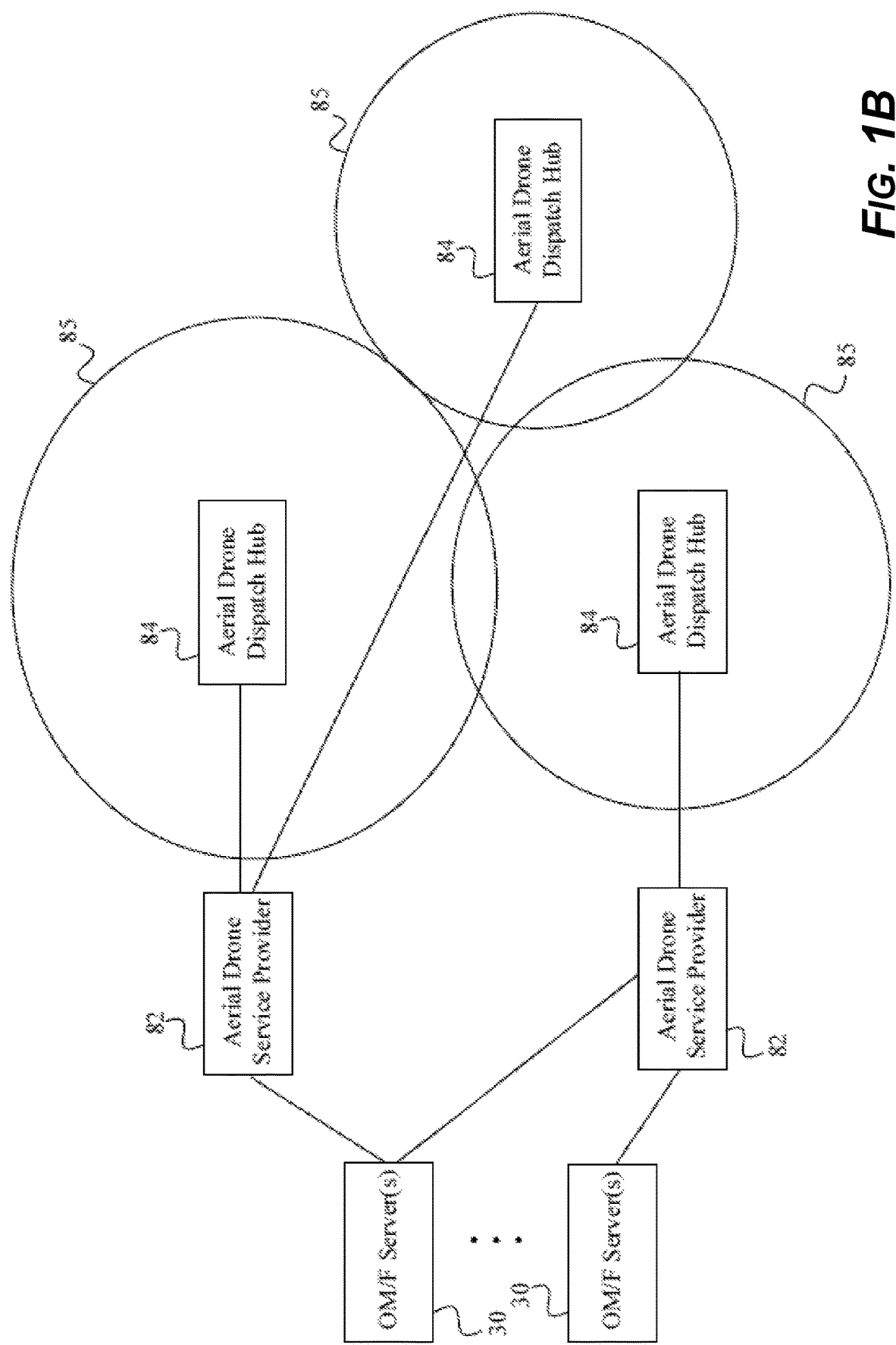
FIG. 1B is a schematic illustration showing representative communication between order management/fulfillment servers and a plurality of aerial drone service providers 82 that provide aerial drone parcel delivery and/or transfer services by way of aerial drone dispatch hubs in particular geographic areas.

For instance, as indicated in FIG. 1B, in several embodiments the order management/fulfillment servers 30 can communicate with electronic/computing systems or devices (e.g., servers) corresponding to one or more aerial drone service providers 82 (e.g., aerial drone service providers 82 that are registered with the system 10). The aerial drone service providers 82 can include or be aerial drone parcel courier entities, organizations, or companies that provide aerial drone parcel delivery and/or transfer services in particular geographic locations, such as by way of one or more corresponding aerial drone dispatch hubs 84. An aerial drone dispatch hub 84 thus serves as a predetermined or central location from which aerial drone parcel delivery and/or transfer services corresponding to an aerial drone service provider 82 are performed within a given geographic area or region 85 (e.g., covering one or more portions of a country, state, or locality). An aerial drone service provider 82 can correspond to an aerial drone fleet operator that manages the operation of a fleet of aerial drones 80, in a manner readily understood by individuals having ordinary skill in the relevant art. A given aerial drone service provider's electronic/computing system(s) or device(s) can also be configured for communication with the aerial drone parcel transfer management server(s) 100, in a manner also readily understood by individuals having ordinary skill in the relevant art.

In multiple embodiments, one or more aerial drone service providers 82 provide aerial drone parcel delivery and/or transfer services on behalf of online merchants that do not provide aerial drone parcel delivery or transfer services themselves, but which have online stores 20 by which aerial drone parcel delivery and/or transfer is offered, for instance, as a product delivery option as part of an online order checkout procedure. Moreover, in some embodiments a particular aerial drone service provider 82 can themselves be an online merchant associated with an online store 20, such as an aerial drone service store 20, by way of which the aerial drone service provider 82 can directly offer aerial drone parcel transfer services to system users independent of or separate from online product orders (e.g., for system users who require aerial drone parcel transfer services for their own parcels, packages, objects, goods, products, or merchandise). Thus, (i) a particular online store 20 can be associated with or owned by an online product merchant that offers certain types of products, and which requires an aerial drone service provider 82 that is distinguishable, distinct, or separate from the online product merchant to provide aerial drone parcel delivery and/or transfer services (e.g., at least aerial drone parcel delivery services) corresponding to product orders linked to the online product merchant; and (ii) another online store 20, such as an aerial drone service store 20, can be associated with an aerial drone service provider 82 that directly offers aerial drone parcel transfer services to system users, where such aerial drone parcel transfer services are not or need not be directly linked to or associated with online product merchants or product orders corresponding thereto.

An aerial drone service provider 82 and the aerial drone dispatch hub(s) 84 associated therewith can provide one or more types of aerial drone parcel transfer services involving (a) aerial drone parcel retrieval or pickup from particular types of aerial drone parcel sources/pickup sites 50; (b) aerial drone parcel transport; and (c) aerial drone parcel delivery to particular types of aerial drone parcel delivery destinations or sites. In several embodiments, aerial drone parcel sources/pickup sites can be specific physical locations corresponding to (a) product warehouses/distribution centers; (b) particular online merchants; and/or (c) registered system users. An aerial drone parcel source/pickup site 50 can be, but need not necessarily be, an ADLP 600 constructed in accordance with an embodiment of the present disclosure. Aerial drone parcel delivery site can correspond to a wide variety of specific physical locations to which parcels can be transported and delivered by way of aerial drones, including but not limited to structures or buildings corresponding to private residences, business or corporate offices, hospitals/medical centers, and government offices (e.g., including post offices). An aerial drone parcel delivery site can be, but need not necessarily be, an ADLP 600 constructed in accordance with an embodiment of the present disclosure.

With respect to online orders for goods or products, order dispatch in the context of various embodiments of the present disclosure includes the delivery of ordered goods or products to purchasers thereof by way of aerial drones 80. More particularly, for an online order that a registered ADLP user of the system 10 has placed by way of an electronic/computing device 400, an aerial drone 80 can transfer a set of products corresponding to the order from a given aerial drone parcel source/pickup site 50 such as a warehouse/distribution center to a target or destination ADLP 600 at which the registered ADLP user is authorized to receive aerial drone deliveries.

With respect to online orders for aerial drone parcel transfer services themselves, such as aerial drone parcel transfer services that are independent of or not directly linked to or associated with goods or products offered by online product merchants, but which instead correspond to aerial drone parcel transfer service requests by which system users can request and pay for aerial drone parcel transfer services independent of an online product merchant, order dispatch in the context of some embodiments of the present disclosure includes aerial drone parcel pickup from a particular aerial drone parcel source/pickup site 50 such as a specific source ADLP 600 (e.g., a user selectable source ADLP 600), and the transfer of the parcel by way of aerial drone 80 to a particular aerial drone parcel delivery site, such as a specific target or destination ADLP 600 (e.g., a user selectable destination ADLP 600).

In various embodiments, the system 10 includes a set of aerial drone parcel transfer (e.g., parcel pickup and/or delivery) management servers 100 coupled to a set of databases or registries 300, including an ADLP registry or database 310, an ADLP user registry or database 330, possibly an online merchant and/or online store registry or database 340, and possibly an order management/fulfillment service registry or database 350. As further detailed below, the ADLP registry 310 stores information corresponding to ADLPs 600 registered with or recognized by the system 10, from which parcel pickups can occur and/or to which parcel deliveries can be made. The ADLP registry 310 includes for each registered ADLP 600 an ADLP address that uniquely identifies the ADLP 600, and which indicates the ADLP's current or most-recent physical location in accordance with a standardized ADLP address format, and which indicates whether the ADLP 600 is authorized, approved, or usable for parcel pickup, parcel delivery, or both. The ADLP user registry 330 stores information uniquely identifying each registered ADLP user, i.e., each user that has registered with the system 10 for purpose of supplying parcels for aerial drone pickup at one or more source ADLPs 600 and/or receiving parcel deliveries at one or more destination ADLPs 600 that the system 10 recognizes and which the user is authorized to use. The online merchant/store registry 340 stores information uniquely identifying online merchants recognized by the system 10, and the online store(s) associated therewith or owned thereby. The order management/fulfillment service registry 350 stores information uniquely identifying each order management/fulfillment service recognized by the system 10, by which order dispatch and fulfillment can occur.

FIGS. 2A-2D are block diagrams showing representative types of uniform or standardized ADLP address formats by which ADLPs 600 can be uniquely identified and located in accordance with an embodiment of the present disclosure, such as one or more of a first through a fourth representative ADLP address format 320*a-d*. In various embodiments, for any given ADLP 600, its ADLP address as defined in accordance with a standardized ADLP address format includes a unique ADLP ID corresponding to the ADLP 600; plus current, expected current, most-recent, expected most-recent, most-recently registered, most-recently or recently measured/determined, most-recently updated/stored (e.g., last stored in the ADLP registry or database 310), or last known geographic, geodetic, or geospatial location information or data for the ADLP 600. The ADLP ID includes or is a numeric or alphanumeric sequence that is unique to a given ADLP 600 under consideration. In some embodiments, the ADLP ID can include or be a manufacturing serial number for the ADLP 600. Additionally or alternatively, the ADLP ID can include or be a unique numeric or alphanumeric sequence, for instance, a unique string of 32 or more numbers (e.g., 32 or 64 bits or digits) and/or alphanumeric characters, that the set of aerial drone parcel transfer management servers 100 generates, creates, selects, or defines for the ADLP 600. The ADLP's current/most-recent/most-recently registered geospatial location information identifies or indicates at least the ADLP's two-dimensional (2D) or earth surface-level geospatial location or coordinates; and in several embodiments identifies, indicates, or estimates the ADLP's three-dimensional (3D) geospatial location or coordinates. For instance, the ADLP's current/most-recent/most-recently registered geospatial location information can include or be a set of GPS coordinates or a 2D Natural Area Code (NAC) for the ADLP 600, as indicated for the first and second representative ADLP address formats 320*a,b*, respectively. Alternatively, as respectively indicated by the third and fourth representative ADLP address formats 320*c, d*, the ADLP's current/most-recent/most-recently registered geospatial location information can include or be set of GPS coordinates plus elevation or altitude data that indicates, approximates, or estimates the ADLP's elevation, altitude, or height above the surface of the earth; or a 3D NAC for the ADLP 600.

Communication between ADLP owners and the aerial drone parcel transfer management server(s) 100, and communication between intended or registered ADLP users and the aerial drone parcel transfer management server(s) 100, can occur by way of the execution of program instruction sets corresponding to application programs or apps, which can respectively provide particular visual and/or graphical user interfaces (GUI) associated with ADLP registration and ADLP user registration. Correspondingly, the set of aerial drone parcel transfer management servers 100 supports, operates in association with, or provides a number of (GUIs) by which:

(a) ADLP owners can utilize electronic/computing devices 400 to register their ADLPs 600 with the system 10 to enable or authorize aerial drone parcel pickups from and/or deliveries to their ADLPs 600, thereby registering their ADLPs with the system 10 and/or becoming registered ADLP owners with respect to the system 10 (e.g., such that products ordered online by way of one or more online stores 20 can be delivered to their ADLPs 600); and (b) individuals (who themselves can be, but in several embodiments need not be, ADLP owners) can utilize electronic/computing devices 400 to register user information with the system 10 and indicate or select one or more ADLPs 600 at which they are authorized to provide parcels for aerial drone pickup and/or receive aerial drone parcel deliveries, thereby becoming registered ADLP users who can utilize the system 10 to flexibly or selectively manage aerial drone parcel pickups from and/or deliveries to a particular set of ADLPs 600 recognized by the system 10, such that a given registered ADLP user can have parcels picked up from and/or delivered to one or more ADLPs 600 that the registered ADLP user is authorized to access or use.

Herein, remarks made with respect to an ADLP owner can equivalently or analogously apply to an ADLP manager and/or an ADLP lessee/renter, in a manner readily understood by individuals having ordinary skill in the relevant art.

In several embodiments, the GUIs supported or provided by the set of aerial drone parcel transfer management servers 100 are associated with or correspond to one or more aerial drone parcel transfer (e.g., parcel pickup and/or delivery) management websites 105 by which (a) an ADLP owner can register one or more of their ADLPs 600 with the system 10, thereby enabling the system 10 to recognize such ADLPs 600 as aerial drone parcel pickup and/or delivery sites; and (b) individuals can become or identify themselves as registered ADLP users before, as part of, or after placement of an online order with an online store 20, such that they can manage aerial drone parcel pickups from and/or deliveries to one or more ADLPs 600 at which they are authorized to provide and/or receive parcels for aerial drone pickup and/or delivery, respectively. In some embodiments, an aerial drone parcel transfer management website can correspond to a Universal Record Locator (URL) such as www.mydroneaddress.org.

Aspects of Representative ADLP Registration

In various embodiments, ADLP registration with the system 10 occurs by way of one or more program instruction sets, application programs, and/or apps and associated visual interfaces or GUIs that enable the set of aerial drone parcel transfer management servers 100 to receive, retrieve, acquire, and/or obtain particular information corresponding to a given ADLP 600 from the ADLP's owner (or a designated or authorized representative thereof) and/or the ADLP 600 itself. In several embodiments, such program instruction sets, application programs, and/or apps can execute on an electronic/computing device 400 corresponding to an ADLP owner, by which the ADLP owner communicates with the set of aerial drone parcel transfer management servers 100. Additionally or alternatively, particular program instruction sets, application programs, and/or apps can execute on the ADLP 600 itself in the event that the ADLP 600 is configured or configurable for communicating (e.g., automatically or semi-automatically communicating) with the set of aerial drone parcel transfer management servers 100 and/or an electronic/computing device 400 associated with the ADLP owner.

Figures 3A, 3B:
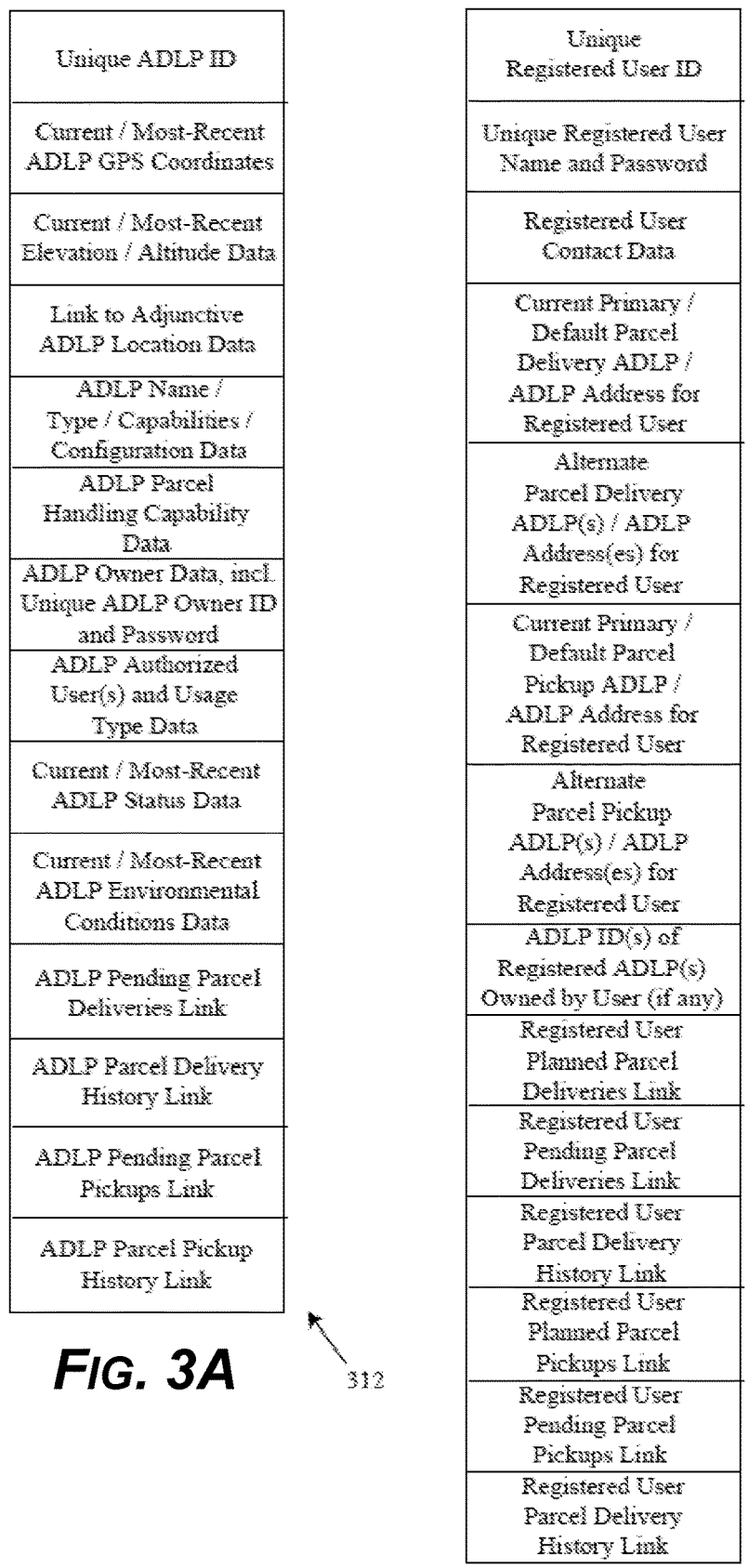
FIG. 3A is a block diagram showing a representative ADLP registry record within an ADLP registry in accordance with an embodiment of the present disclosure.
FIG. 3B is a block diagram showing a representative ADLP user registry record within an ADLP user registry in accordance with an embodiment of the present disclosure.

As part of ADLP registration for a given ADLP 600, the set of aerial drone parcel transfer management servers 100 generates a record for the ADLP 600 within the ADLP registry 310. FIG. 3A is a block diagram showing a representative ADLP registry record 312 within the ADLP registry 300 in accordance with an embodiment of the present disclosure. In a representative embodiment, the ADLP registry record 312 includes or is a data structure storing at least some of the following: a unique ID corresponding to the ADLP 600 under consideration; a set of current/most-recent geospatial coordinates (e.g., GPS coordinates) for the ADLP 600; possibly current/most-recent elevation or altitude data for the ADLP 600; ADLP name, type, configuration, and/or capabilities data; possibly adjunctive ADLP location data and/or a link thereto, which can aid ADLP localization and ADLP parcel delivery/pickup; ADLP parcel handling capability data; ADLP owner data; ADLP authorized user(s) data and corresponding usage type data; possibly current/most-recent ADLP status data; possibly current/most-recent ADLP environmental conditions data; a link to pending parcel deliveries scheduled for the ADLP 600; a link to a history of parcel deliveries for the ADLP 600; a link to pending parcel pickups scheduled for the ADLP 600; and a link to a history of parcel pickups for the ADLP 600.

In several embodiments, for a given ADLP 600, the combination of the ADLP's unique ID, its current/most-recent geospatial coordinates, and possibly its current/most recent elevation or altitude data within the ADLP registry record 312 corresponding to this ADLP 600 corresponds to, establishes, or defines the ADLP's address for parcel pickup and/or delivery purposes (e.g., in accordance with a standardized ADLP address format 320*a*-*d*), in association with or by which an aerial drone 80 can geospatially locate and confirm the identity of the ADLP 600, and retrieve or pick up a parcel therefrom, and/or deliver a parcel thereto.

In some embodiments, the set of current/most-recent geospatial coordinates for the ADLP 600 can be obtained from or provided by a GPS unit carried by the ADLP 600 itself. Alternatively, the set of current/most-recent geospatial coordinates for the ADLP 600 can be obtained by a GPS unit of a mobile telephone or similar electronic/computing device 400, which is disposed proximate to (e.g., directly above) the ADLP 600, and which is in communication with the ADLP 600 and/or the aerial drone parcel transfer management server(s) 100 by way of an ADLP registration/management app, as further detailed below.

With respect to ADLP altitude or elevation, in a number of embodiments, the current/most-recent elevation or altitude data for the ADLP 600 can be provided by or obtained from an altimeter (e.g., a barometric altimeter and/or a GPS based altimeter) carried by the ADLP 600 itself (e.g., which is configured to sense barometric or atmospheric pressure and determine an estimated elevation or altitude based thereon, with respect to a calibrated pressure reference corresponding to a known elevation or altitude). Additionally or alternatively, the current/most-recent elevation or altitude data for the ADLP 600 can be obtained from or provided by an altimeter carried by an aerial drone 80 at the time of parcel delivery to the ADLP 600, where the aerial drone 80 and/or the ADLP 600 can communicate an altimeter reading to the set of aerial drone parcel transfer management servers 100. Yet additionally or alternatively, in certain embodiments the current/most-recent elevation or altitude data for the ADLP 600 can be obtained or provided by an altimeter carried by a mobile telephone or other type of electronic/computing device, which is disposed proximate to or on the ADLP 600 (e.g., a short distance such as 0.5-30 cm directly above a parcel receiving surface of the ADLP 600, or directly on the ADLP's parcel receiving surface), and which is in communication with the ADLP 600 and/or the aerial drone parcel transfer management server(s) 100 by way of the ADLP registration/management app. Still further additionally or alternatively, the current/most-recent elevation or altitude data for the ADLP 600 can be manually communicated by the ADLP owner to the ADLP 600 and/or the aerial drone parcel transfer management server(s) 100, such as by way of ADLP owner input directed to a touch screen display of a mobile telephone or other type of electronic/computing device in communication with the ADLP 600, or a keypad or keyboard coupled to or carried by the ADLP 600. In some embodiments, the current/most-recent elevation or altitude data can include multiple elevation or altitude readings and/or an averaged elevation or altitude reading, for instance, corresponding to altimeter readings obtained in multiple manners and/or across different aerial drone parcel deliveries.

In some embodiments, the adjunctive ADLP location data can include a postal code within which the ADLP 600 resides. Depending upon embodiment details, the adjunctive ADLP location data or the link thereto can include a set of reference geospatial coordinates, altitudes/elevations, and compass readings corresponding to one or more ADLP access paths or aerial drone approach paths along which aerial drone parcel deliveries to or pickups from the ADLP 600 under consideration have recently or previously been successful; and/or a set of images corresponding to structures and/or objects in the physical environment at which the ADLP 600 resides, including images captured at particular reference geospatial coordinates, altitudes/elevations, and compass readings. This set of images can include one or more images of a site or building at which the ADLP 600 resides, or portions of such a site or building. Moreover, this set of images can include a number of images that had been previously captured by one or more aerial drones 80 during prior parcel delivery or pickup operations directed to the ADLP 600 under consideration (e.g., during one or more daytime and possibly nighttime conditions), such that during a current aerial drone parcel delivery or pickup operation, an image captured by an aerial drone 80 at a set of reference geospatial coordinates, a reference altitude/elevation, and a reference compass reading that provides a particular or predetermined view of a building or a portion thereof at which the ADLP 600 is expected to reside can be compared to one or more previously captured images corresponding to the ADLP's known or verified building location to aid ADLP location confirmation. Such images can be stored in one or more network-accessible databases, such as an ADLP location image database 900, in a manner readily understood by individuals having ordinary skill in the relevant art.

The ADLP name data can designate or specify a human language name or moniker for the ADLP 600, and/or one or more portions of a written address (e.g., a street address and postal code) corresponding to the ADLP 600.

The ADLP type data can designate a categorical type or categorical type code for the ADLP 600, which can indicate an ADLP ownership context and/or an ADLP usage context for the ADLP 600. In a number of embodiments, the ADLP type data can designate the ADLP 600 as falling into a particular categorical ADLP type such as one of the following:

Private—Single Residence Use
Shared—Multi-Residence Use
Private—Single Business/Corporate Use
Shared—Multi-Business/Corporate Use
Public—Post Office Use
Public—Shipping/Receiving Business Use
Public—Educational Institution Use
Private—Educational Institution Use
Public—Library Use
Private—Other Government Agency Use With respect to the above categories, "Private—Single Residence Use" indicates that the ADLP 600 is owned by a private individual or a single family, and the ADLP 600 is available for use by the occupant(s) of a single private residence such as a specific condominium unit or apartment corresponding to this private individual or family. "Shared—Multi-Residence Use" indicates that the ADLP 600 is owned by a residential organization, association, or group such as a homeowners association corresponding to a multi-residence area such as a subdivision, or a multi-residence building such as a condominium or apartment complex, and the ADLP 600 is available for shared use by the residents of the multi-residence area or building. "Private—Single Business/Corporate Use" indicates that the ADLP 600 is owned a single business or corporation, and is available for use by at least some workers thereof. "Shared—Multi-Business/Corporate Use" indicates that the ADLP 600 is owned by a business-related organization, association, or group such as a corporate office building management entity, and the ADLP 600 is available for use by particular workers from multiple business or corporate entities. "Public—Post Office Use" indicates that the ADLP 600 is owned by a government post office (e.g., the United States Post Office), and is available for use by members of the public (e.g., authorized members of the general public, such as members of the general public that have become registered users with the system 10). "Public—Shipping/Receiving Business Use" indicates that the ADLP 600 is owned by a shipping/receiving or courier enterprise, business, or company that provides parcel or package shipping and receiving services to members of the public, for instance, in accordance with a particular type of fee structure. "Public—Educational Institution Use" indicate that the ADLP 600 is owned by an educational institution, and is available for use by members of the public. "Private—Educational Institution Use" indicates that the ADLP 600 is owned by an educational institution, and is available for particular individuals associated therewith (e.g., members of a particular college or one or more college departments). "Public—Library Use" indicates that the ADLP 600 is owned by a public library, and is available for use by members of the public. Finally, "Private—Other Government Agency Use" indicates that the ADLP 600 is owned by a government agency other than a post office, and is available for use by at least some workers of that government agency. Individuals having ordinary skill in the relevant art will recognize that the foregoing ADLP type data is representative for purpose of aiding understanding, and additional or other ADLP type data can be defined, or ADLP type data can possibly be omitted depending upon embodiment details.

The ADLP configuration/capabilities data can indicate a base or minimum set of functional or operational capabilities that the ADLP 600 supports or for which the ADLP 600 is configured, and can further indicate a set of additional, enhanced, or augmented functional/operational capabilities beyond the base functional/operational capabilities that the ADLP 600 supports. For instance, the base set of functional/operational capabilities can correspond to or specify that the ADLP 600 supports the provision of local radio frequency (RF) or local optical aerial drone guidance signals, QR code display, and wire-based data network communication; and the additional set of functional/operational capabilities can indicate that the ADLP 600 supports image capture operations, infrared local optical guidance signals, and cellular data network communication. Particular representative types of ADLP functional/operational capabilities are described in greater detail below.

The ADLP parcel handling capability data can indicate maximum parcel dimensions and a maximum parcel mass that the ADLP 600 is capable of handling. The ADLP owner data can indicate at least some of a name, an address, a set of telephone numbers (e.g., a mobile telephone number, a home telephone number, and/or a work telephone number), one or more e-mail addresses, and a unique registered owner ID and password corresponding to an individual or entity that owns the ADLP 600. The ADLP authorized users data can include a list of e-mail addresses, mobile telephone numbers, and/or registered ADLP user IDs that correspond to, indicate, or identify individuals that are authorized or permitted to receive aerial drone parcel deliveries at the ADLP 600 under consideration. If the ADLP type data designates the ADLP 600 as "Public—Post Office Use" or "Public—Shipping/Receiving Business Use," the ADLP authorized users data can simply specify "any" or "public." For each ADLP authorized user, the corresponding ADLP usage type data indicates whether the authorized user is permitted to use the ADLP 600 for aerial drone parcel deliveries only, aerial drone parcel pickups only, or both aerial drone parcel deliveries and pickups.

The current/most-recent ADLP status data can indicate whether the ADLP 600 is currently carrying a parcel or is ready to receive a parcel (e.g., whether the parcel receiving surface of the ADLP is deployed or available for parcel delivery, or whether a parcel currently resides on the ADLP's parcel receiving surface), and possibly an ADLP communication status (e.g., online or offline) and/or an ADLP power status. In some embodiments, the current/most-recent ADLP environmental conditions data can indicate current or most-recent weather conditions at the ADLP's specified geospatial address coordinates, and/or can indicate whether moisture is present on the ADLP's parcel receiving surface (e.g., as indicated by a moisture sensor 605 carried by the ADLP 600). The link to pending parcel deliveries for the ADLP 600 can reference a list of online orders for which delivery to the ADLP 600 has been scheduled, but not yet completed. The link to the parcel delivery history for the ADLP 600 can reference a list of online orders that have successfully been delivered to the ADLP 600, and possibly a list of online orders for which delivery to the ADLP 600 was attempted but not completed (e.g., due to weather conditions or other factors, such as a power failure). The link to pending parcel pickups for the ADLP 600 can reference a list of online parcel pickup orders for which pickup from the ADLP 600 has been scheduled, but not yet completed. Finally, the link to the parcel pickup history for the ADLP 600 can reference a list of online parcel pickup orders corresponding to completed parcel pickups from the ADLP 600, and possibly a list of online parcel pickup orders for which pickup from the ADLP 600 was attempted but not completed (e.g., due to weather conditions or other factors, such as a power failure).

Aspects of Representative ADLP User Registration

In various embodiments, a registered ADLP user can be a private individual, or a representative of an organization such as a business, government agency, intergovernmental/extra-governmental organization, or non-profit organization. ADLP user registration with the system 10 can occur by way of one or more application programs and/or apps that enable the aerial drone parcel transfer management server(s) 100 to receive, retrieve, acquire, and/or obtain particular user information or data corresponding to an individual or organization seeking the ability to flexibly or selectively manage aerial drone parcel deliveries to one or more ADLPs 600 that are registered with the system 10 and which the individual is authorized to use. Such application programs and/or apps can execute on an electronic/computing device 400 corresponding to the individual or organization (or a designated or authorized representative thereof) by which the individual or a person within the organization (or their designated or authorized representative) communicates with the aerial drone parcel transfer management server(s) 100.

For a given intended system user under consideration, as part of ADLP user registration the set of aerial drone parcel transfer management servers 100 generates a record for the ADLP user within the ADLP user registry 330. FIG. 3B is a block diagram showing a representative ADLP user registry record 332 within the ADLP user registry 330 in accordance with an embodiment of the present disclosure. In a representative embodiment, the ADLP user registry record 332 includes or is a data structure storing at least some of the following: a unique ID corresponding to the registered user; a unique registered user name and password; registered user contact details or data, including a physical address with postal code, a mobile telephone number, and possibly an e-mail address; a current primary or default parcel delivery ADLP 600 and/or a default parcel delivery ADLP address for the registered user, at which the registered user primarily receives or on a default basis receives aerial drone parcel deliveries; a list of one or more alternate parcel delivery ADLPs 600 or alternate parcel delivery ADLP addresses for the registered user at which the user is authorized to receive aerial drone parcel deliveries; a current primary or default parcel pickup ADLP 600 and/or a default parcel pickup ADLP address for the registered user, from which aerial drone parcel pickups primarily or on a default basis occur; a list of one or more alternate parcel pickup ADLPs 600 or alternate parcel pickup ADLP addresses for the registered user from which the user is authorized to provide parcels for aerial drone parcel pickup; a link to a list of planned but yet-to-be scheduled aerial drone parcel deliveries for the registered user; a link to a list of scheduled and hence currently pending aerial drone parcel deliveries for the registered user, where each pending aerial drone parcel delivery specifies a corresponding target ADLP address that identifies an ADLP 600 to which the parcel is to be delivered; a link to an aerial drone parcel delivery history list corresponding to the registered ADLP user; a link to a list of planned but yet-to-be scheduled aerial drone parcel pickups for the registered user; a link to a list of scheduled and hence currently pending aerial drone parcel pickups for the registered user, where each pending aerial drone parcel pickup specifies a corresponding target ADLP address that identifies an ADLP 600 from which the parcel is to be picked up; and a link to an aerial drone parcel pickup history list corresponding to the registered ADLP user.

A unique registered user ID can include or be, for instance, a user-selectable sequence of alphanumeric characters having at least a predetermined length; an e-mail address corresponding to the registered user; and/or the user's mobile telephone number including country code. In the event that the registered ADLP user is an ADLP owner and has already registered their ADLP 600 with the system, the ADLP 600 that they own can be defined, specified, or selected as the user's primary or default parcel delivery ADLP 600 and/or a default parcel pickup ADLP 600. Alternatively, the registered ADLP user's primary or default parcel delivery ADLP 600 or their primary or default parcel pickup ADLP 600 can be specified or selected as another ADLP 600, such as a publicly accessible ADLP 600, for instance, within the registered ADLP user's postal code or within a selectable or predetermined distance or range of such user's physical address or postal code. A set of alternate parcel delivery and/or or parcel pickup ADLP addresses for the registered ADLP user can include one or more ADLP addresses uniquely identifying a number of other ADLPs 600 that the registered ADLP user is authorized to use for aerial drone parcel delivery and/or pickup, respectively, such as an ADLP 600 located at or near the registered ADLP user's workplace.

The list of planned but yet-to-be scheduled parcel deliveries for a registered ADLP user can be automatically generated and maintained or managed by way of communication or interaction between the order management/fulfillment servers 30 and the set of aerial drone parcel transfer management servers 100, as part of the order management/fulfillment servers 30 performing order management/fulfillment operations. Similarly or analogously, the list of pending aerial drone parcel deliveries for the registered ADLP user (i.e., scheduled parcel deliveries for which a delivery time and date as well as an ADLP address have been confirmed or selected but delivery has not yet been attempted or completed) can be automatically generated and maintained or managed by way of interaction between the order management/fulfillment servers 30, the aerial drone parcel transfer management server(s) 100, and the registered ADLP user. Further similarly or analogously, the registered ADLP user's aerial drone parcel delivery history list can be automatically generated and maintained or managed by way of interaction between the order management/fulfillment servers 30 and the aerial drone parcel transfer management server(s) 100. Each of the foregoing lists can be stored in the set of databases 300 and/or elsewhere, in a manner readily understood by individuals having ordinary skill in the relevant art.

The list of planned but yet-to-be scheduled parcel pickups for a registered ADLP user can be automatically generated and maintained or managed by way of communication or interaction between the order management/fulfillment servers 30 and the set of aerial drone parcel transfer management servers 100, as part of the order management/fulfillment servers 30 performing order management/fulfillment operations. Similarly or analogously, the list of pending aerial drone parcel pickups for the registered ADLP user (i.e., scheduled parcel pickups for which a pickup time and date as well as an ADLP address have been confirmed or selected but pickup has not yet been attempted or completed) can be automatically generated and maintained or managed by way of interaction between the order management/fulfillment servers 30, the aerial drone parcel transfer management server(s) 100, and the registered ADLP user. Further similarly or analogously, the registered ADLP user's aerial drone parcel pickup history list can be automatically generated and maintained or managed by way of interaction between the order management/fulfillment servers 30 and the aerial drone parcel transfer management server(s) 100. Each of the foregoing lists can be stored in the set of databases 300 and/or elsewhere, in a manner readily understood by individuals having ordinary skill in the relevant art.

Aspects of Representative Online Merchant/Online Store Registration

In some embodiments, online merchants can register with the system 10, and can further register their online stores 20 with the system 10. More particularly, online merchant and/or online store registration with the system 10 can occur by way of a set of application programs or apps by which the aerial drone parcel transfer management server(s) 100 can receive, retrieve, acquire, and/or obtain particular information or data identifying an online merchant and/or the online store(s) corresponding thereto. As part of online merchant registration, the set of aerial drone parcel transfer management servers 100 can generate a record for the online merchant, as well as a record for each of the online merchant's online stores 20, within the online merchant/store registry 340. FIG. 3C is a block diagram showing a representative online merchant registry record 342 within the online merchant/store registry 340 in accordance with an embodiment of the present disclosure. In a representative embodiment, the online merchant registry record 342 includes or is a data structure storing at least some of the following: a unique online merchant ID; online merchant contact information; a set of online store IDs uniquely identifying each online store 20 corresponding to the online merchant, through which registered ADLP users can place online orders; and a set of order management/fulfillment service IDs identifying the order management/fulfillment services that the online merchant utilizes for managing, dispatching, and fulfilling online orders placed through the online stores 20.

FIG. 3D is a block diagram showing a representative online store registry record 344 within the online merchant/store registry 340 in accordance with an embodiment of the present disclosure. In a representative embodiment, the online store registry record 344 includes or is a data structure storing for each online store 20 at least some of the following: an online store ID that uniquely identifies the online store 20; online store offering type data, which can indicate whether the online store offers goods/products/merchandise, and/or directly provides aerial drone parcel delivery services; a set of order management fulfillment server addresses identifying one or more order management fulfillment servers that handle order management, dispatch, and fulfillment operations for the online store; a link to not-yet-scheduled orders for the online store 20, i.e., online store orders that have been placed but for which a specific date and time for corresponding aerial drone parcel transfer has not been confirmed; a link to a link to pending orders for the online store 20, i.e., online store orders for which a specific date and time for corresponding aerial drone parcel transfer has been confirmed, but for which aerial drone parcel transfer has not been completed; and a link to completed orders for the online store (e.g., a link to a completed order history for the online store 20).

Aspects of Representative Order Management/Fulfillment Service Registration

In some embodiments, order management/fulfillment services can register with the system 10. More particularly, order management/fulfillment service registration with the system 10 can occur by way of a set of application programs or apps by which the aerial drone parcel transfer management server(s) 100 can receive, retrieve, acquire, and/or obtain particular information or data corresponding to an order management/fulfillment service that handles online orders for one or more online merchants and the online stores 20 corresponding thereto. As part of order management/fulfillment service registration, the set of aerial drone parcel transfer management servers 100 generates a record for the order management/fulfillment service within the order management/fulfillment service registry 350. FIG. 3E is a block diagram showing a representative order management/fulfillment service registry record 352 within an order management/fulfillment service registry in accordance with an embodiment of the present disclosure. In a representative embodiment, the order management/fulfillment service registry record 352 includes or is a data structure storing for each online store 20 at least some of the following: an order management/fulfillment service ID that uniquely identifies the order management/fulfillment service; order management/fulfillment service contact information; a set of order management/fulfillment server addresses corresponding to the order management/fulfillment service; a list of aerial drone service providers 82 utilized or provided by the order management/fulfillment service; aerial drone parcel service provider contact information; a list of online stores 20 that utilize the order management/fulfillment service; a link to not-yet-scheduled orders handled by the order management/fulfillment service; a link to pending orders handled by the order management/fulfillment service; and a link to completed orders handled by the order management/fulfillment service.

Aspects of Representative Electronic/Computing Devices

Registered ADLP owners and registered ADLP users can use utilize various types of electronic/computing devices 400 for communicating with the system 10. Similarly, individuals purchasing online products or aerial drone parcel transfer services by way of online stores 20 can utilize various types of electronic and/or computing devices 400 for communicating with the online stores 20 and placing online orders therewith. For instance, in several embodiments, as part of an online product order process, an online store 20 can present a parcel delivery type selection interface to online purchasers of products, which includes at least one aerial drone parcel delivery as a parcel delivery option (e.g., in addition to standard or expedited conventional land-based parcel delivery options). Such a parcel delivery type selection interface can include or be one or more portions of a GUI by which the purchaser selects a radio button indicating aerial drone parcel delivery provided by way of a particular aerial drone service provider 82, in a manner analogous or substantially identical to conventional user selection of standard or expedited land-based parcel delivery options. In the event that an online product purchaser interacting with an online store 20 is not yet a registered ADLP user, an online store 20 can communicate with the aerial drone parcel transfer management server(s) 100 to perform an ADLP user registration process by which the purchaser can register with the system 10.

Figure 4A:
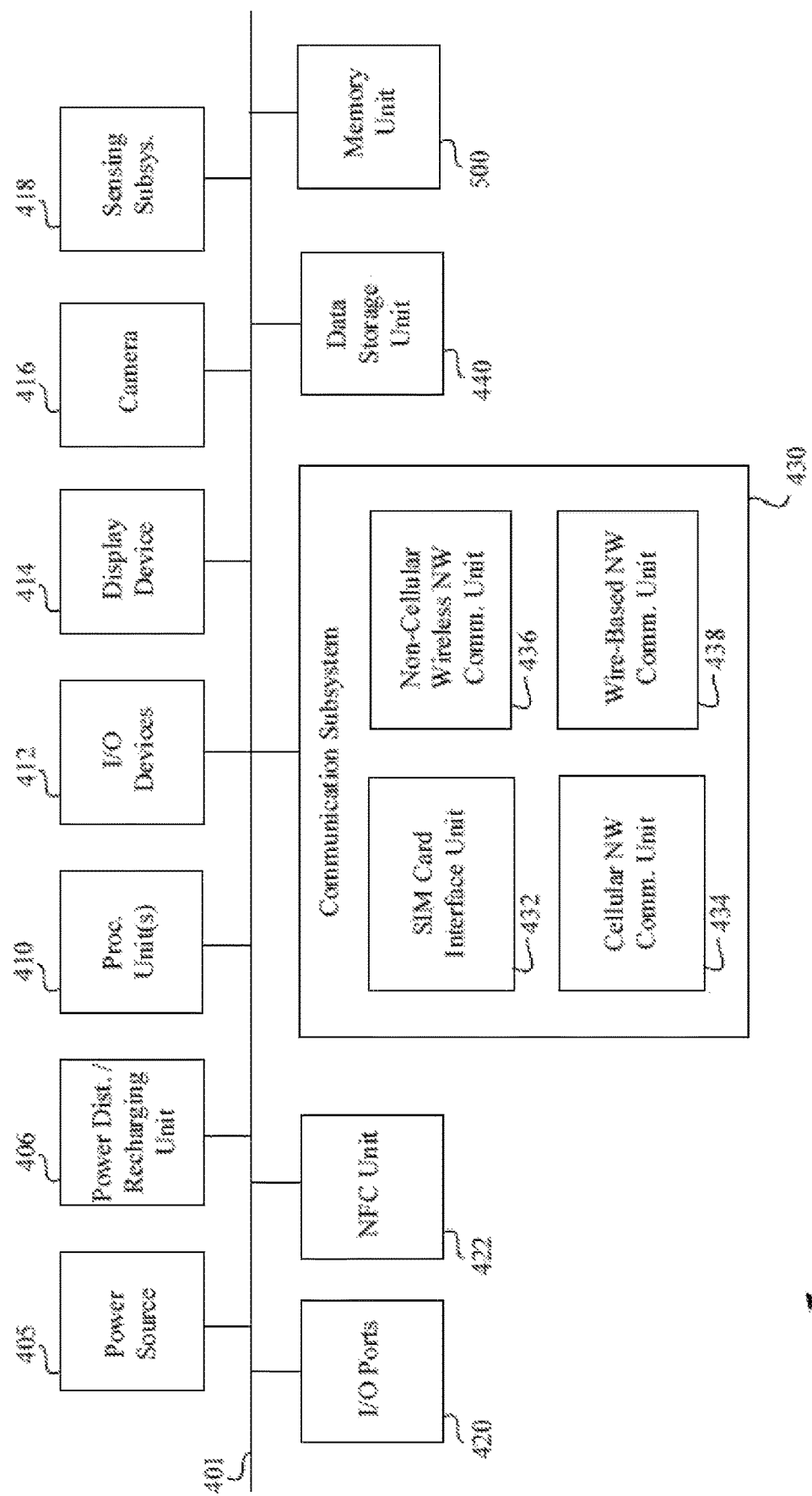
FIGS. 4A and 4B are block diagrams showing portions of a representative electronic/computing device corresponding to a system user (e.g., a registered ADLP owner and/or a registered ADLP user) in accordance with an embodiment of the present disclosure.
Figure 4B:
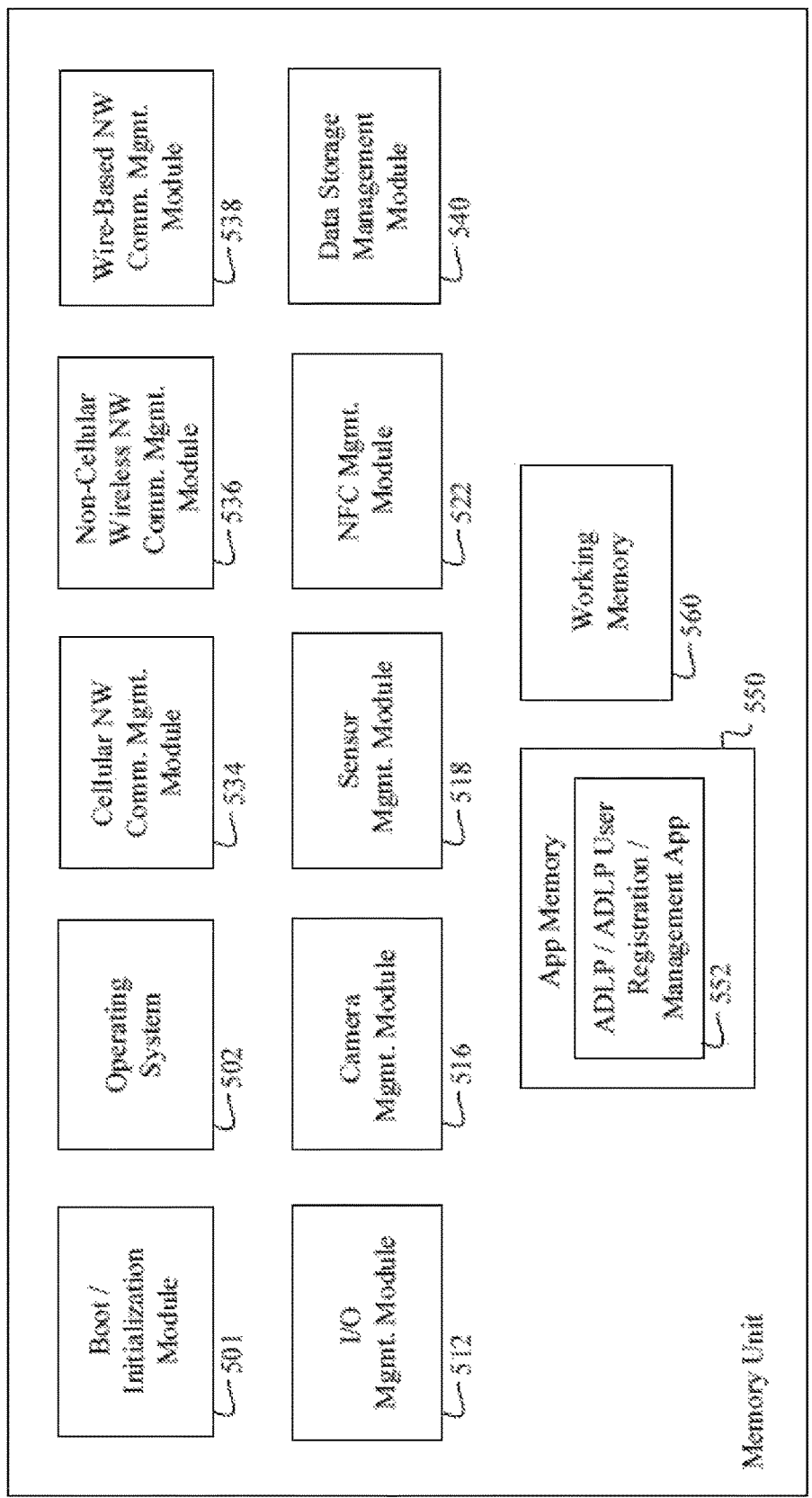

FIGS. 4A and 4B are block diagrams showing portions of a representative electronic/computing device 400 corresponding to a system user (e.g., a registered ADLP owner and/or a registered ADLP user) in accordance with an embodiment of the present disclosure, by which the user can communicate with the aerial drone parcel transfer management server(s) 100. As indicated above, such an electronic/computing device 400 can take various forms. Depending upon embodiment details, the electronic/computing device 400 includes a power source 405; a power distribution and possibly a recharging unit 406; at least one processing unit 410; a set of input/output (I/O devices) 412; at least one display device 414; possibly a camera 416; possibly a sensing subsystem 418, which can include a GPS unit, and can also include an altimeter; a set of I/O ports 420; possibly a near field communication (NFC) unit 422; a communication subsystem 430, which can possibly include one or more of (a) a subscriber identity module (SIM) card interface unit 432 and a corresponding cellular network communication unit 434, (b) a non-cellular wireless network communication unit 436, and (c) a wire-based network communication unit 438; a data storage unit 440; and a memory unit 500. Each element of the electronic/computing device 400 can be coupled to a set of signal/data communication pathways such as one or more buses 401.

As indicated in FIG. 4B, depending upon embodiment details the memory unit 500 includes a boot/initialization module 501; an operating system 502; possibly a cellular network communication management module 534, a non-cellular wireless network communication management module 536, and/or a wire-based network communication management module 538; an I/O management module 512; a camera management module 516; a sensor management module 518; an NFC management module 522; a data storage management module 540; an app memory 550; and a working memory 560. An ADLP/ADLP user registration/management app 552 or ADLP management app 552 resides within the app memory 550. Each of the foregoing modules can include program instruction sets that when executed by the processing unit(s) 410 facilitate or enable a particular type of electronic/computing device functionality. Thus, the ADLP management app 552 facilitates or enables ADLP registration/management and ADLP user registration/management functionality in accordance with an embodiment of the present disclosure. Depending upon embodiment details, a single or unified ADLP management app 552 can selectively perform functions or operations corresponding to both ADLP registration/management and ADLP user registration/management; or the ADLP management app 552 can exist as separate apps for ADLP registration/management and ADLP user registration/management, in a manner readily understood by individuals having ordinary skill in the relevant art.

In various embodiments the ADLP management app 552 is configured for communicating with the aerial drone parcel transfer management server(s) 100, and includes program instruction sets configured by which (a) an ADLP owner can register or de-register their ADLP(s) and manage (e.g., update) particular types of information corresponding to their registered ADLPs 600; and/or (b) a system user can become a registered ADLP user or de-register as an ADLP user, manage (e.g. update) their registered ADLP user information, and manage aspects of online order fulfillment, including the confirmation or selection of a destination ADLP 600 to which aerial drone parcel delivery is to occur for a particular online product order, and a date and time on which such delivery is to occur; and/or the confirmation or selection of a source ADLP 600 from which aerial drone parcel pickup corresponding to a particular online aerial drone parcel transfer service order is to occur, and a date and time on which such pickup is to occur.

Aspects of Representative Aerial Drone Parcel Transfer Management Servers

Figure 5:
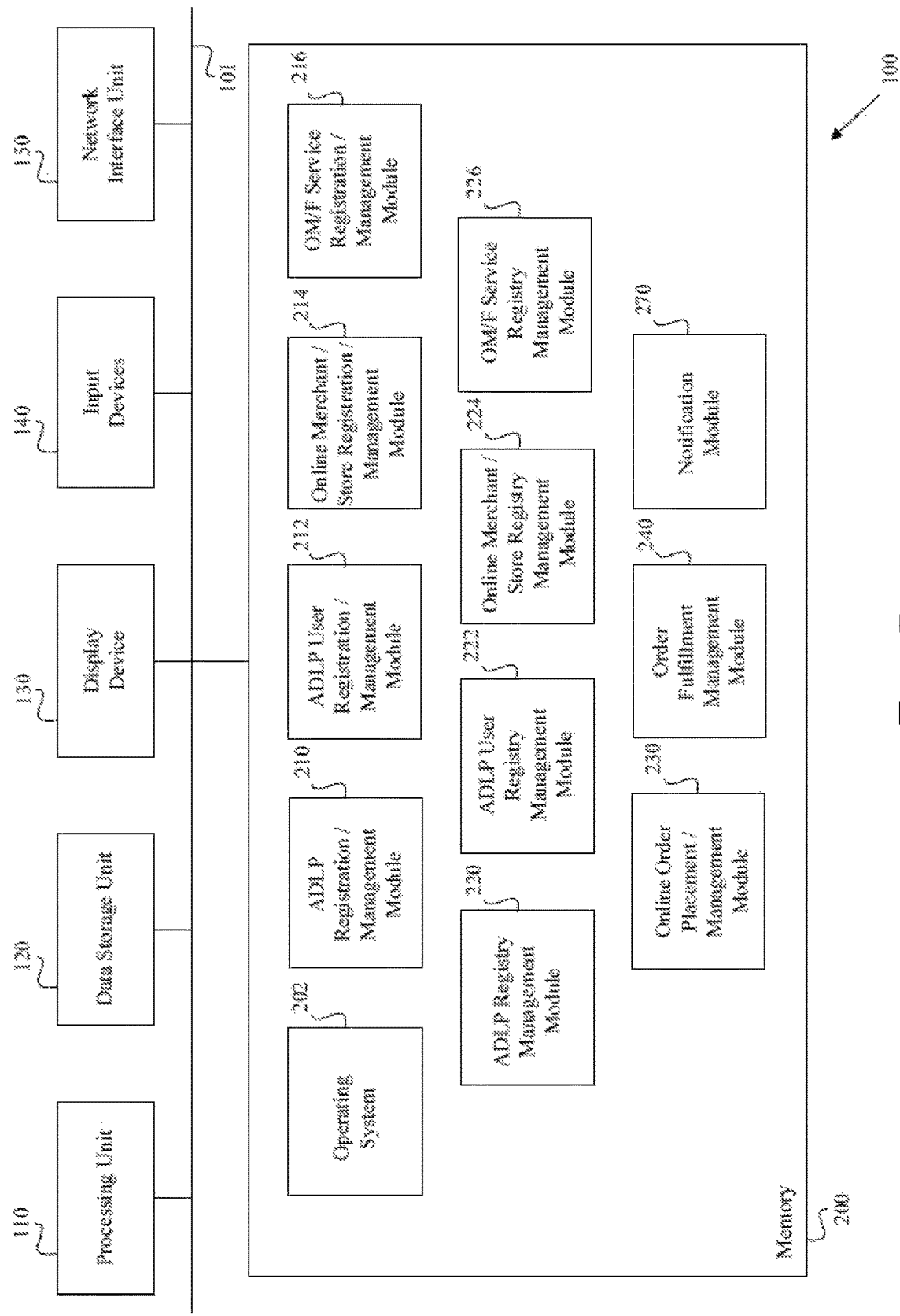
FIG. 5 is a block diagram showing portions of a representative aerial drone parcel transfer management server in accordance with an embodiment of the present disclosure.

FIG. 5 is a block diagram showing portions of a representative aerial drone parcel transfer management server 100 in accordance with an embodiment of the present disclosure. In an embodiment, the aerial drone parcel transfer management server 100 includes at least one processing unit 110; a data storage unit 120; a display device 130; a set of input devices 140; a network interface unit 150; and a memory 200, each of which can be coupled to a set of signal/data communication pathways such as one or more buses 101. The memory 200 includes or stores therein an operating system 202; an ADLP registration/management module 210; an ADLP user registration/management module 212; an online merchant/online store registration/management module 214; an order management/fulfillment service registration/management module 216; an ADLP registry management module 220; an ADLP user registry management module 222; an online merchant/store registry management module 224; an order management/fulfillment service registry management module 226; an online order placement/management module 230; an order fulfillment management module 240; and a notification module 270. Each of such modules includes program instruction sets that when executed by the processing unit(s) 110 facilitate or enable particular types of aerial drone parcel transfer management server functionality, such as functionality described herein including communication with electronic/computing systems or electronic/computing devices 400 associated with system users (e.g., registered ADLP owners and registered ADLP users), online stores 20, order management/fulfillment servers 30, aerial drone service providers 82, and ADLPs 600.

Aspects of Representative ADLPs

FIGS. 6A-6D illustrate aspects of particular representative ADLPs 600*a-d* in accordance with embodiments of the present disclosure. While certain elements, structures, and/or structural features shown in FIGS. 6A, 6B, 6C, and/or 6D are described in the context of the ADLP embodiments corresponding to these FIGs., an individual having ordinary skill in the art will recognize that one or more elements, structures, or structural features described and shown herein with reference to a particular embodiment of an ADLP 600*a-d* can also be a part of or present on one or more other embodiments of ADLPs 600 not described or shown herein. Moreover, an ADLP 600 can include additional and/or other elements, structures, and/or structural features not described herein, yet still fall within the scope of the present disclosure.

Figure 6A:
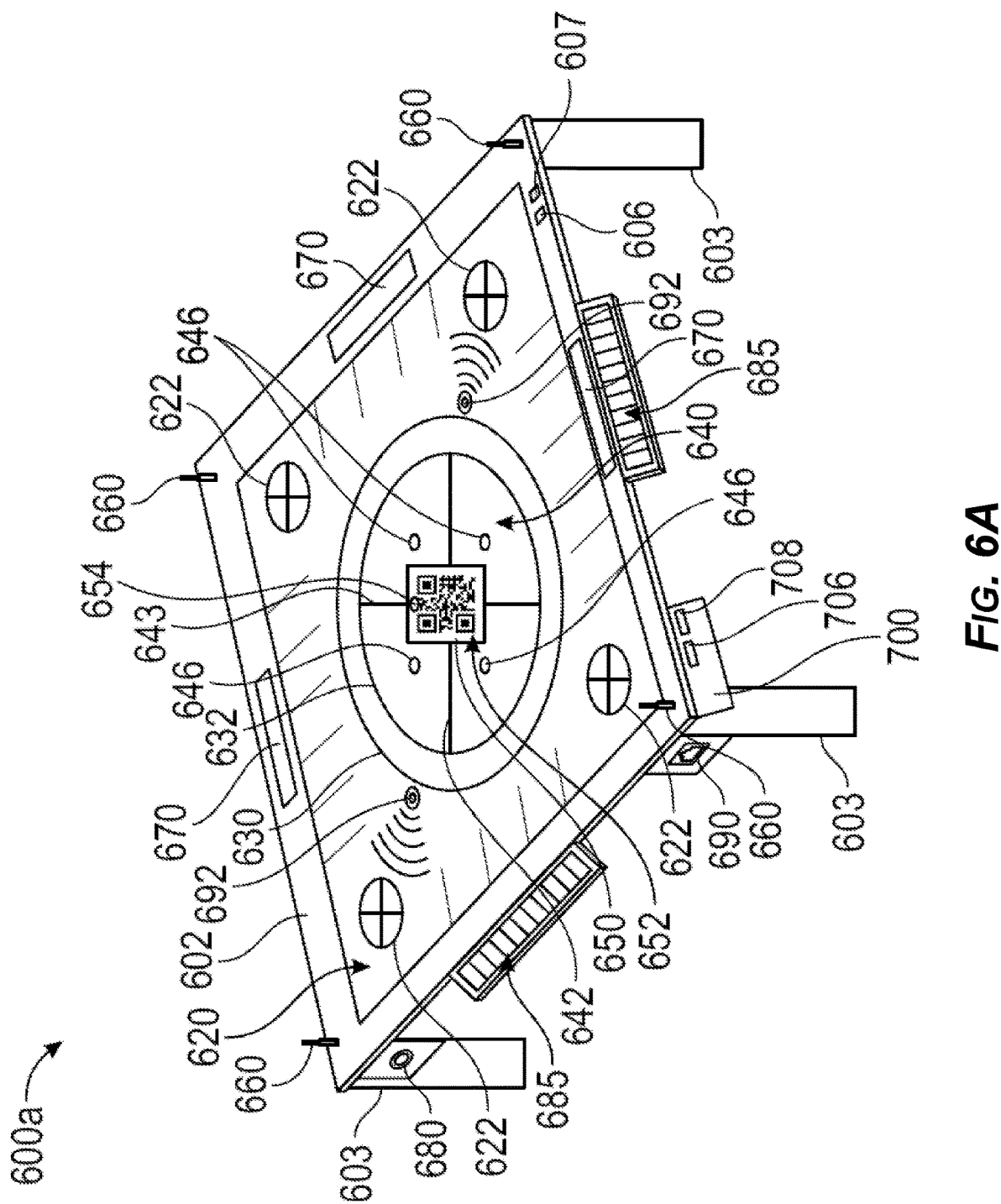
FIG. 6A is a schematic illustration of a representative ADLP in accordance with an embodiment of the present disclosure.

FIG. 6A is a schematic illustration of a representative ADLP 600*a* in accordance with an embodiment of the present disclosure. In an embodiment, the ADLP 600*a* includes a landing surface, stage, shelf, grid/grille, and/or mat 620 (hereafter landing mat 620 or mat 620 for purpose of brevity) that is carried or supported by a frame 602; and a set of supports or legs 603 (for instance, one to eight or possibly more legs 603, e.g., such as four legs 603 in the embodiment shown) that elevate the frame 602 away from a surface such as the ground. Depending upon embodiment details, the frame 602 and/or the mat 620 can exhibit various types of shapes, such as rectangular, square, elliptical, circular, octagonal, hexagonal, triangular, or other shapes. Moreover, the dimensions of the frame 602, the legs 603, and/or the mat 620 can vary depending upon embodiment details, such as in accordance with a largest parcel size that the ADLP 600*a* is configured or expected to be capable of handling; and/or the material(s) from which the frame 602, the legs 603, and the mat 620 are made can vary based upon embodiment details, such as in accordance with a maximum parcel mass that the ADLP 600*a* is configured for carrying. In several embodiments, the frame 602 and the legs 603 are made of metal and/or a sturdy plastic material; and the mat 620 can include or be made of a firm or generally firm rubber, rubber-like, or polymer material (e.g., a conventional rubber/polymer material having a slightly resilient surface). In a number of embodiments, for an ADLP 600*a* intended for private or shared residential use, the mat 620 has dimensions of approximately 100×100 centimeters, or somewhat or slightly greater or slightly less than 100×100 centimeters (e.g., in accordance with city and/or building or residential association regulations), and can be configured for carrying parcels up to 25 kg. In certain embodiments, an ADLP 600*a* intended for shared multi-business/corporate use (e.g., in an industrial park) can including a mat 620 having dimensions of up to 200×200 centimeters, and can be configured for carrying parcels up to 50-100 kg.

The mat 620 includes an exposed or exposable surface (e.g., a planar or generally planar surface) such as an upper surface that is oriented or orientable in an approximately horizontal or horizontal position (e.g., with respect to the ground), and which is configured for carrying a parcel, for instance, a parcel provided for aerial drone pickup from the mat 620, or a parcel received during aerial drone delivery to the mat 620. In various embodiments, one or more types of machine recognizable and/or machine readable indicators, markings, patterns, codes, and/or images associated with the ADLP 600*a* can be provided, carried, or presented by the mat 620, where such code(s) can be automatically detected, recognized, and/or captured by an aerial drone 80 for facilitating or enabling automatic or semi-automatic recognition of the ADLP 600*a* and/or accurate aerial drone parcel delivery or pickup approximately within or within a predetermined spatial region or zone on the ADLP's mat 620. For instance, in the embodiment shown, the mat 620 includes a plurality of corner zone guidance markers 622; an outer parcel deposit zone marker 630; an inner parcel deposit zone marker 632 that is concentric with the outer parcel deposit zone marker 630, and which corresponds to an optically distinct central parcel deposit zone 640; and a pair of cross-hair lines 642, 643 that approximately divide or divide the central parcel deposit zone 640 into quadrants.

Further to or as an alternative to the foregoing, in various embodiments the mat 620 is configured to surround, support, carry, or include portions of a display area, structure, or device 650 that can present one or more machine readable codes or images 652 such as a barcode or Quick Response (QR) code that are optically detectable, recognizable, and/or capturable by an aerial drone 80. In some embodiments, the display area 650 is disposed on and/or in a predetermined region (e.g., a central region) of the mat 620. For instance, a predetermined region of the mat 620 itself can have one or more machine readable codes or images 652 such as a QR code printed thereon and/or embedded therein. In other embodiments, the display area 650 includes an electronic display device such as a flat panel display (for instance, a flat panel light emitting diode (LED) display, e.g., a flexible organic LED (OLED) which can present one or more machine readable codes or images 652 such as the barcode or Quick Response (QR) code.

The code(s) or image(s) 652 presented by the display area/device 650 can correspond to, identify, or aid identification of the ADLP 600*a*. For instance, the display area/device 650 can present a QR code 652 that uniquely identifies the ADLP 600*a* in accordance with one or more portions of its corresponding registered ADLP address. Additionally or alternatively, in certain embodiments the code(s) or image(s) 652 (e.g., the QR code 652) can include information corresponding to or identifying a parcel in currently transit to the ADLP 600*a* by way of an aerial drone 80. In some embodiments, the underlying data representing such code(s) or image(s) 652 can be generated by way of the aerial drone parcel transfer management server(s) 100, and communicated to the ADLP 600*a*, e.g., in association with an ADLP registration process.

In multiple embodiments, the mat 620 is coupled to, carries, or includes a first set of pressure or force sensors 646, which can be in contact therewith or embedded therein (e.g., in portions of the mat 620 within the central parcel deposit zone 640), and which can aid determination of whether a parcel currently resides on the mat 620.

Optionally, the ADLP 600*a* can include one or more cameras 654. For instance, the ADLP 600*a* can include a set of cameras 654 disposed on peripheral portions of the display device 650 and/or elsewhere (e.g., on portions of the frame 602), in a manner readily understood by individuals having ordinary skill in the relevant art. By way of the camera(s) 654, the ADLP 600*a* can capture images before, during, and/or after aerial drone parcel delivery or pickup operations to respectively aid determination of whether parcel delivery or pickup has occurred and/or was successful (e.g., by capturing an upwardly directed or upward looking image using a camera 654 disposed on a periphery of the display device 650 after aerial drone parcel delivery or pickup operations, and comparing this captured image with a corresponding image captured prior to aerial drone parcel delivery or pickup operations), in a manner readily understood by individuals having ordinary skill in the relevant art. One or more images captured by the camera(s) 654 can be electronically communicated to the ADLP owner and/or intended parcel recipient as part of a parcel delivery notification process, in a manner also readily understood by individuals having ordinary skill in the relevant art.

The ADLP 600*a* can further include a number of RF and/or optical guiding signal emission sources that are respectively configured for outputting local RF and/or local optical guiding signals by which an aerial drone 80 can recognize and locate or more precisely target the ADLP 600*a* during parcel delivery or pickup operations when the aerial drone 80 is within a short or relatively short distance of the ADLP 600*a* (e.g., within a local guiding signal detection range, such as less than approximately 100 meters, or about 50 meters or less, from the ADLP 600*a*). For instance, the ADLP 600*a* can include a plurality of RF antennas 660 (e.g., disposed at or near particular corners of the frame 602); and one or more optical illumination elements or devices such as visible spectrum and/or infrared (IR) spectrum beacons and/or strobes 670 (e.g., disposed along portions of the frame 602 that are likely or most likely to be within the field of view of a camera or image capture device carried by an aerial drone 80 during parcel delivery to or pickup from the ADLP 600*a*). In several embodiments, the ADLP 600*a* includes at least first through third RF antennas 660 configured for outputting local RF guiding signals in one or more predetermined frequency bands, which an aerial drone 80 can detect (e.g., when the aerial drone 80 is within a local RF guiding signal detection range of the ADLP 600*a*, such as within approximately 10-50 meters of the ADLP 600*a*), and which can aid aerial drone recognition of the ADLP 600*a*, and can aid determination of the ADLP's spatial position and orientation by way of triangulation, in a manner readily understood by individuals having ordinary skill in the art.

In multiple embodiments, the ADLP 600*a* additionally or alternatively includes a plurality of LED arrays, strips, or bars 670 configured for outputting light in predetermined portions of visible and/or infrared wavelength spectral ranges (e.g., visible light in a wavelength band of approximately 580-620 nm, and/or infrared light having a center wavelength of approximately 850 or 940 nm), which is detectable by an aerial drone camera, and which can aid automatic or semi-automatic aerial drone ADLP recognition, identification, and/or determination of the ADLP's spatial position and orientation. Such light sources 670 can be configured or oriented to output light along predetermined upward and outward angular ranges relative to the ADLP's mat 620, such as at an angle of 30-60 degrees with respect to the surface of the mat 620.

The use of infrared light, such as short or very short bursts of infrared light (e.g., generally high intensity or high intensity infrared light) output by conventional infrared LED lighting devices (or output by a conventional flash discharge tube or lamp through an infrared filter) in a strobing configuration, can facilitate or enable aerial drone recognition and localization of the ADLP 600*a* under weather conditions (e.g., rain, fog, or snow) in which optical signals within the human visual spectral range may be less effective than infrared light for ADLP recognition, identification, or localization. Moreover, the use of infrared light permits optical signal based ADLP recognition, identification, or localization without significantly disturbing or disturbing normal daytime and nighttime human visual perception. Thus, an ADLP 600*a* that includes one or more infrared light sources 670 such as infrared LED arrays, strips, or bars 670 can be used in a densely populated environment such as a high rise condominium estate that includes multiple closely spaced condominium towers, or a downtown area in which high rise buildings are relatively closely or closely spaced with respect to each other (e.g., less than 50-100 meters apart), without significantly interfering or interfering with the normal daytime and nighttime visual perception of building occupants or passers-by or causing such individuals to experience visual distractions.

In addition to the foregoing, the ADLP 600*a* includes at least one power source, such as a coupling to a source of line power 680 and/or a set of batteries 685 (e.g., primary and possibly secondary/backup batteries). Various embodiments of the ADLP 600*a* also typically include data network communication circuitry, such as one or more standard data network interfaces 690 (e.g., an Ethernet interface/port, and/or one or more Universal Serial Bus (USB) interfaces/ports) and electrical circuitry corresponding thereto. In certain embodiments, the ADLP 600*a* includes one or more short or generally short range wireless data network communication devices 692, such as a set of Z-wave, WiFi, Bluetooth®, or other type of wireless data network communication devices, by which the ADLP 600*a* can communicate with a corresponding type of wireless data network in proximity or close proximity thereto, such as a home or business wireless network. The ADLP 600*a* also has a control unit or controller 700 corresponding thereto (e.g., which can be built into the ADLP 600*a*, or which is separable or separate from the frame 602 of the ADLP 600*a*, or which can be provided by an electronic/computing device 400 distinct from the ADLP 600*a*) as further detailed below. The control unit 700 can have associated therewith or include a set of geolocation sensors 706 configured for sensing or determining the ADLP's current geolocation, and possibly an altimeter/elevation sensor 708 such as a second set of pressure sensors configured for sensing, determining, or estimating the ADLP's current elevation/altitude, such as by way of sensing barometric pressure.

In some embodiments the ADLP 600*a* includes cellular network communication circuitry (e.g., a SIM card interface, a SIM card, and a corresponding cellular modem) by which the ADLP 600*a* can send and receive information by way of one or more cellular networks. Such cellular network communication circuitry can form portions of the ADLP's control unit 700. Moreover, in certain embodiments, such cellular network communication circuitry can facilitate or enable more robust or robust communication between the ADLP 600*a* and the aerial drone parcel management server(s) and/or and an aerial drone 80 that carries cellular network communication circuitry (e.g., a SIM card interface, a SIM card, and a cellular modem).

The ADLP 600*a* can include or have associated therewith additional and/or other sensors or sensing devices, such as a microphone 606, a temperature and/or humidity sensor 607, and/or other types of sensors or sensing devices. The detection of particular types of audio signals in the ADLP's external environment (e.g., audio signals having particular frequency characteristics and amplitudes/magnitudes, such as a minimum threshold magnitude) by way of the microphone 606 can aid control unit determination of whether an aerial drone is present directly above or on the mat 620. The ADLP 600*a* can also include or be coupled to one or more RF and/or optical signal sensing or detection elements in a manner readily understood by individuals having ordinary skill in the relevant art, by which the ADLP 600*a* can respectively detect or sense RF and/or optical signals output by an aerial drone to aid confirmation of aerial drone presence proximate to the ADLP 600*a*. An RF or optical signal sensing element can include an antenna or a photodetector/photodiode or image capture device, respectively.

Multiple additional or other types of ADLPs 600 in accordance with embodiments of the present disclosure exist, for instance, depending upon an environment in which the ADLP 600 is expected to be (most commonly) deployed or used, and whether the ADLP 600 is (typically) fixed in position, or easily movable/mobile/portable. Additional representative ADLPs 600 in accordance with further embodiments of the present disclosure are described in detail hereafter with reference to FIGS. 6B and 6C, where like reference numbers indicate similar, analogous, or like elements with respect to the ADLP embodiment 600*a* shown in FIG. 6A.

Figure 6B:
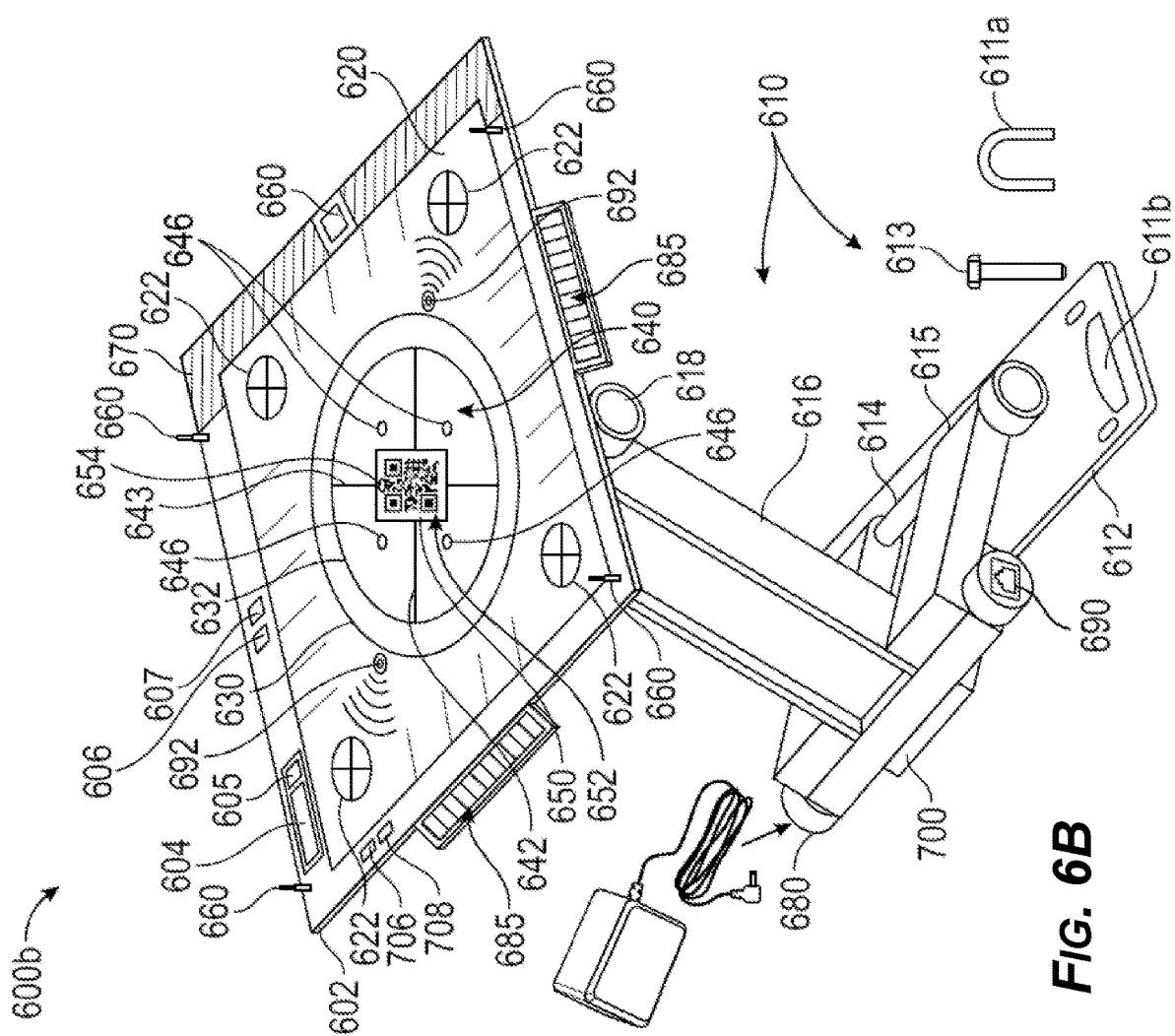
FIG. 6B is a schematic illustration of a representative ADLP in accordance with another embodiment of the present disclosure.

FIG. 6B is a schematic illustration of a representative ADLP 600*b* in accordance with another embodiment of the present disclosure, which is mountable to a reference structure such as a railing or beam (e.g., corresponding to a portion of a balcony or patio of a condominium or apartment unit), and is selectively positionable (e.g., in a swingable and/or pivotable manner) relative to the reference structure. Such an ADLP 600*b* can include a swingable/pivotable support structure 610 having a mounting base 612 that can be secured to the reference structure by way of conventional fastening/attachment devices such as a set of u-bolts 611*a* and u-bolt supports 611*b*, and/or straight bolts 613 and corresponding nuts; one or more swivel rods 614 and/or a swivel arm device 615 coupled or couplable to the base 612; and a support arm member or pillar 616 coupled to the swivel rod(s) 616/swivel arm device 615, and which extends away (e.g., along an upward direction) away from the base 612. In various embodiments, the support pillar 616 carries the ADLP's frame 602, which itself holds the ADLP's mat. The support pillar 618 can include a tiltable joint (not shown) by which the planar orientation of the frame 602 and hence the mat 620 can be adjusted, and a frame lock mechanism 618 by which the frame 602 and hence the mat 620 can be securely held in position once oriented in an intended manner. In a number of embodiments, the ADLP 600*b* also includes a level sensor 604 in order to aid accurate leveling of the mat 620.

This ADLP 600*b* also includes elements such as those described above with reference to FIG. 6A. Moreover, this ADLP 600*b* can further include a set of moisture sensors 605 by which the ADLP's control unit 700 can determine whether one or more surfaces or portions of the ADLP 600*b* are wet (e.g., as a result of rain).

Figure 6C:
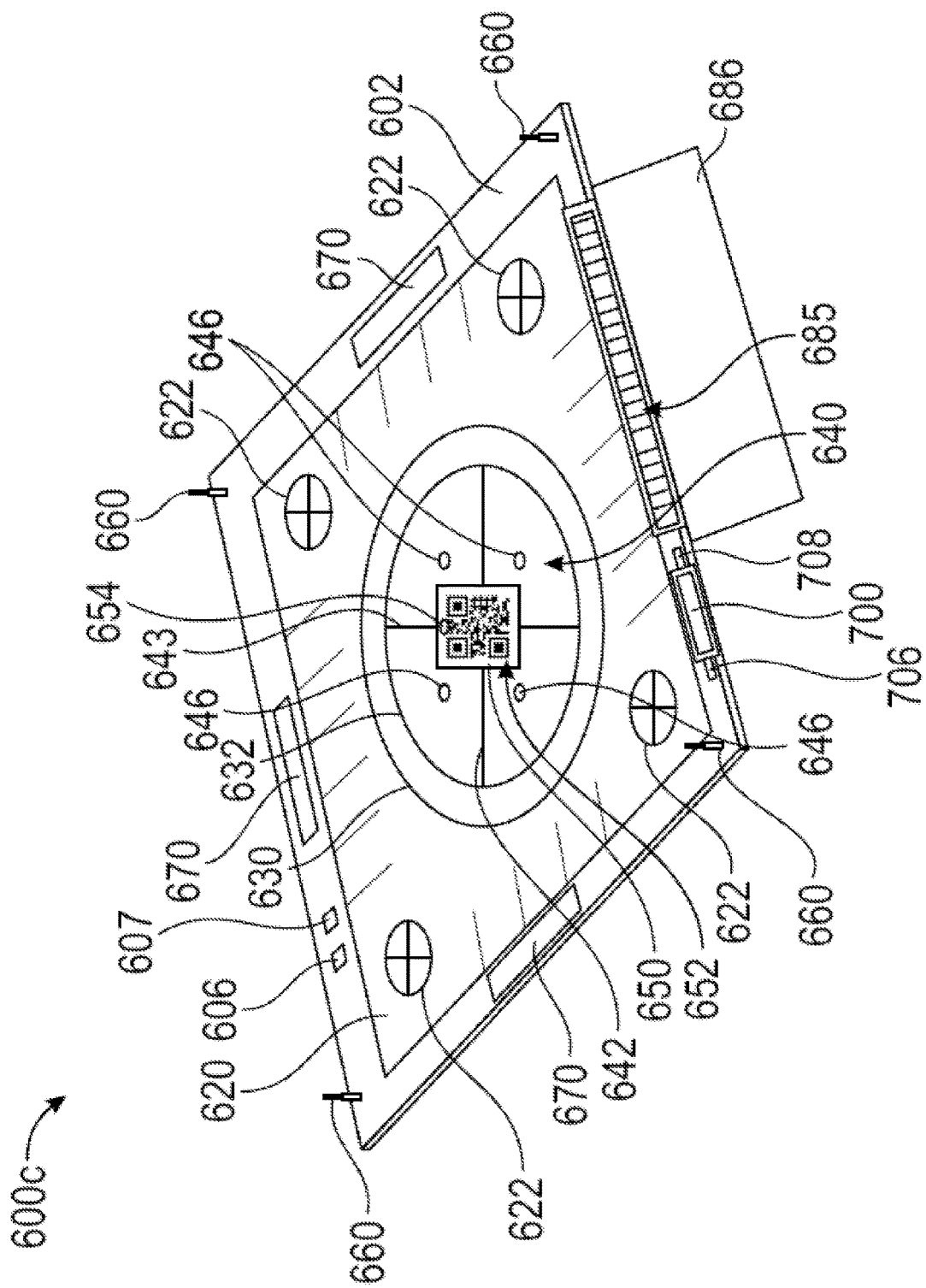
FIG. 6C is a schematic illustration of a representative ADLP in accordance with yet another embodiment of the present disclosure.

FIG. 6C is a schematic illustration of a representative ADLP 600*c* in accordance with a yet another embodiment of the present disclosure. This ADLP 600*c* is positionable or deployable on essentially any type of flat horizontal, approximately flat horizontal, nearly flat horizontal, or generally flat horizontal surface such as the ground, or on an approximately flat horizontal surface provided by a physical structure such as a portion of a transportation vehicle (e.g., the bed of a pickup truck, or the rooftop of a delivery vehicle). For purpose of brevity, a flat, approximately flat, nearly flat, or generally flat horizontal surface is referred to hereafter as a flat surface. This ADLP 600*c* is also portable/transportable or readily portable/transportable. In various embodiments, the ADLP 600*c* of FIG. 6C does not include a rigid frame 602, or a rigid frame 602 can be detachable from the mat 620 or an optional accessory, and hence the mat 620 of this ADLP 600*c* and the elements carried thereby or disposed thereon can be folded or rolled into a compact state when not deployed on a flat surface.

In several embodiments, the ADLP 600c of FIG. 6C is couplable to or includes a solar panel 686, in order to facilitate its use in remote locations where ready access to line power or line power based battery recharging may be unpredictable or unavailable. This ADLP 600c need not include short range wireless data network communication devices 692 (e.g., ZigBee, WiFi, or Bluetooth® communication devices), though such devices can be optionally included in particular embodiments.

Figure 6D:
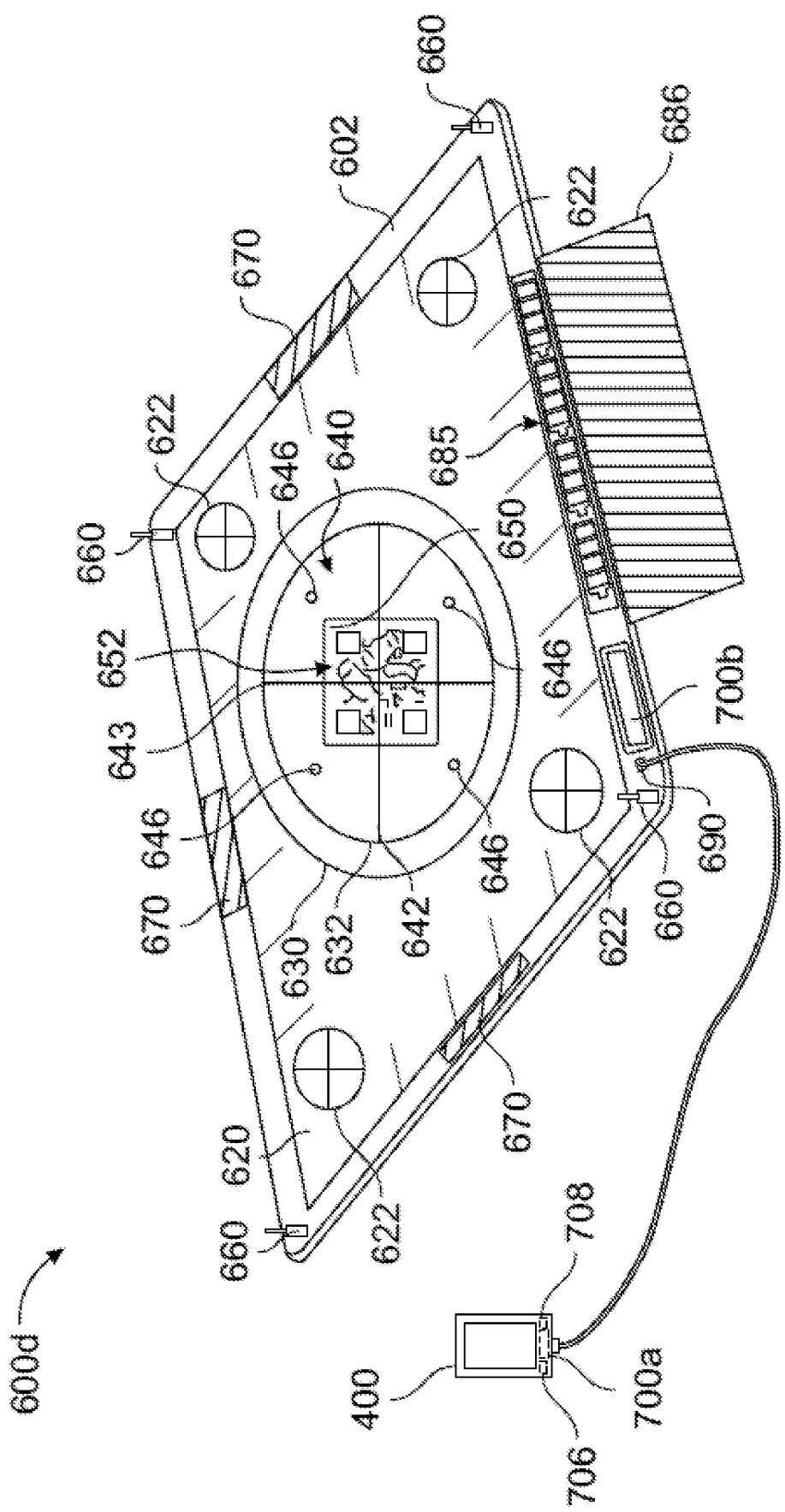
FIG. 6D is a schematic illustration of a representative ADLP in accordance with a further embodiment of the present disclosure.

FIG. 6D is a schematic illustration of a representative ADLP 600d in accordance with a further embodiment of the present disclosure. In such an embodiment, particular portions of the ADLP's control unit 700 and/or one or more types of ADLP sensors or sensing devices need not be integrated with or built into the ADLP 600d itself, but can be provided by an external electronic/computing device 400 disposed in proximity or close proximity to or on the ADLP 600d. For instance, hardware and software resources (e.g., a processing unit and a number of program instruction sets) provided by a mobile telephone 400 or other type of portable/mobile device can provide or operate as particular portions of an ADLP's control unit 700, and/or one or more types of ADLP sensing devices. The mobile telephone 400 can include in its memory an ADLP parcel delivery and pickup management app, which when executed by the mobile telephone's processing unit can manage, control, and/or perform particular types of ADLP parcel delivery and pickup operations as further detailed below. The ADLP parcel delivery pickup and management app can be linked with or form a portion of an ADLP management app 552, in a manner readily understood by individuals having ordinary skill in the relevant art.

In the embodiment shown, hardware and software resources provided by the mobile telephone 400 serve as portions of the ADLP's control unit 700 to form a first ADLP control unit 700a external to the ADLP 600d, as well as the ADLP's geolocation unit 706, and possibly the ADLP's altimeter/elevation sensor 708. The ADLP 600d itself includes a second control unit 700b configured for wire-based or wireless communication with the first control unit 700a, such as by way of a conventional USB cable that couples the mobile telephone 400 to a USB port 690 of the ADLP 600d.

Figure 6E:
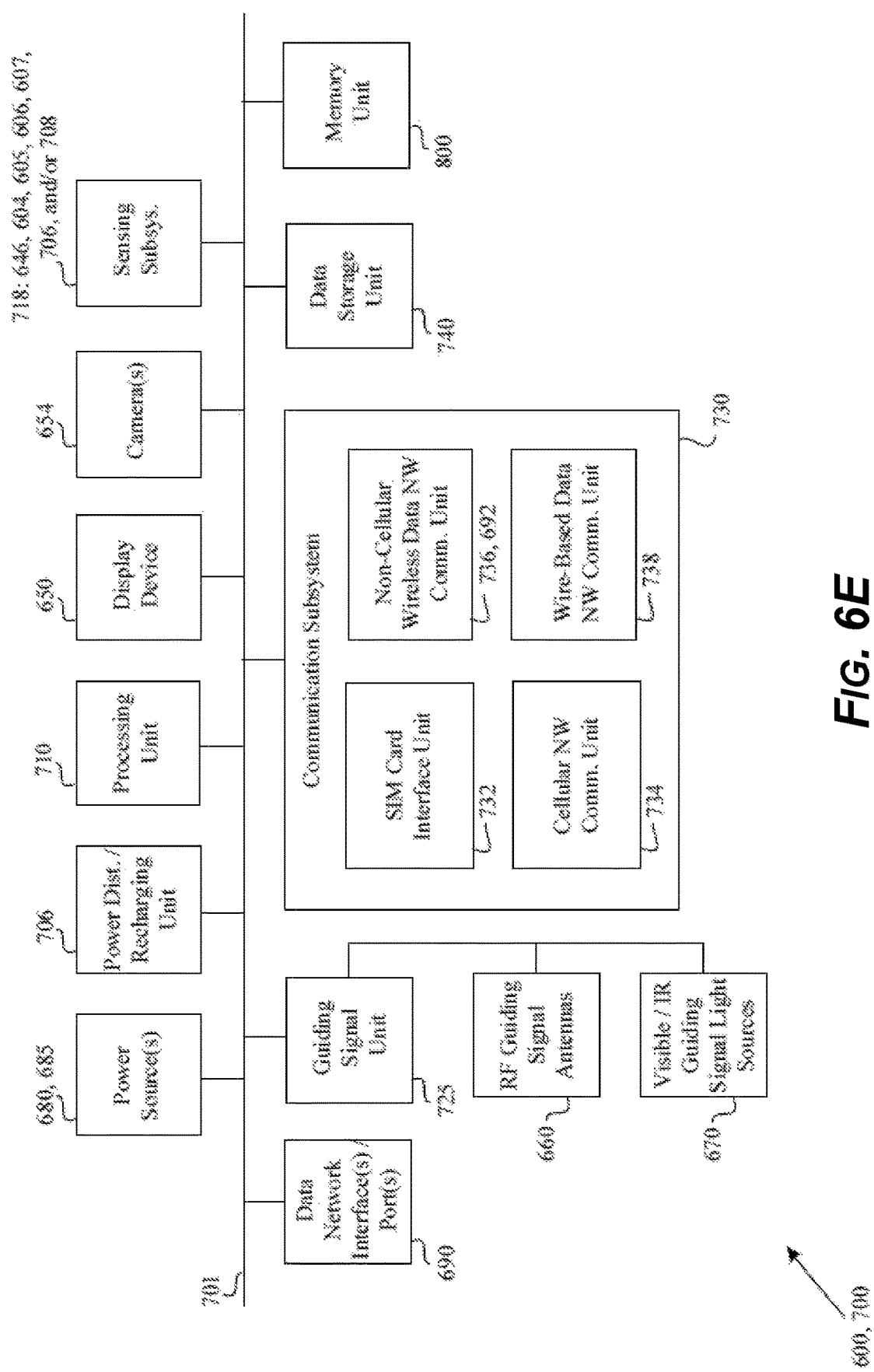
FIGS. 6E-6F are block diagrams showing portions of a representative ADLP, including a corresponding ADLP control unit having a memory in which particular representative program instruction sets reside in accordance with an embodiment of the present disclosure.
Figure 6F:
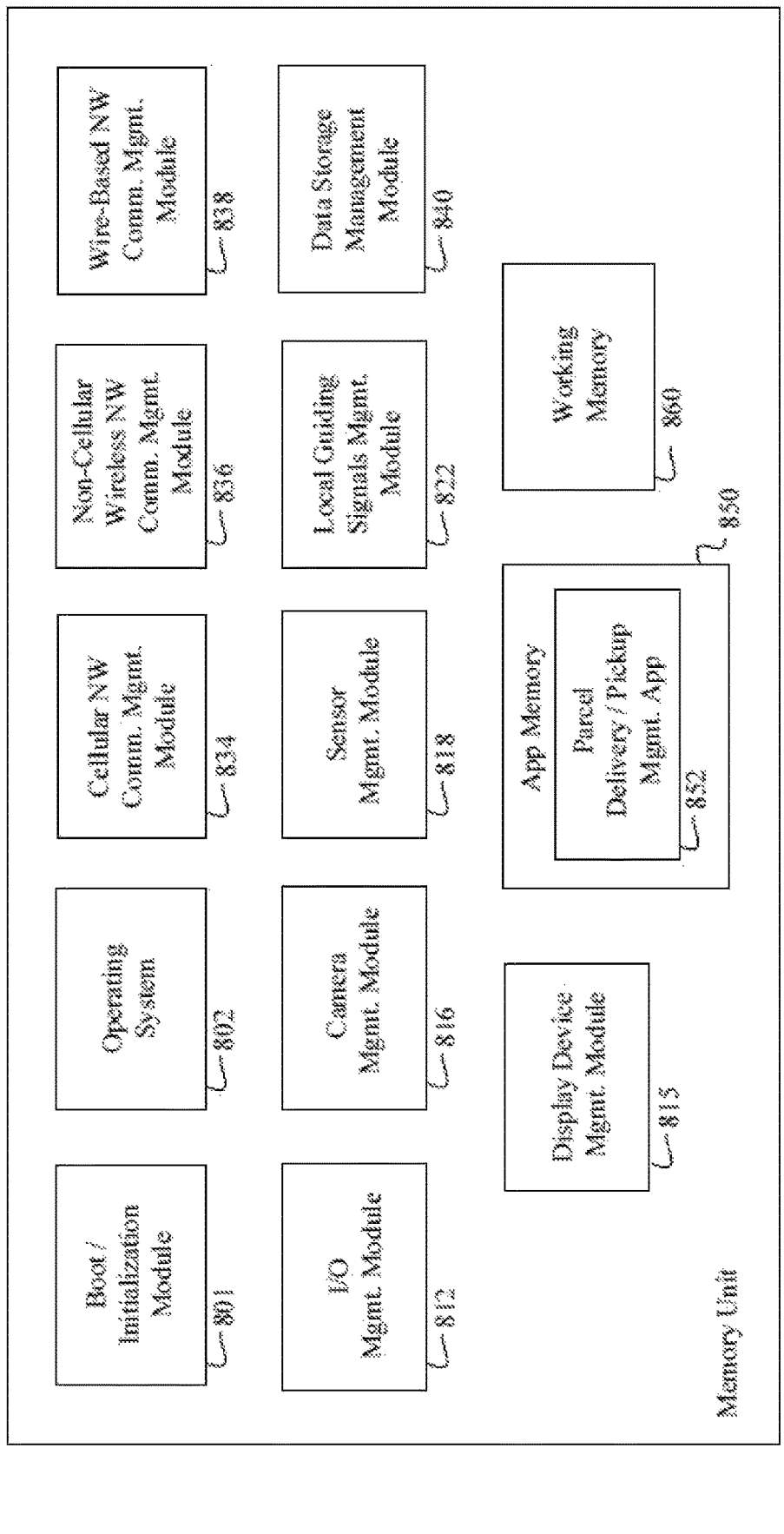

FIGS. 6E-6F are block diagrams showing portions of a representative ADLP 600, including a corresponding ADLP control unit 700 having a memory 800 in which particular representative program instruction sets for managing or aiding aerial drone parcel delivery operations reside in accordance with an embodiment of the present disclosure. In FIGS. 6E-6F, 700 series and 800 series reference elements correspond to portions of the control unit 700.

As indicated in FIG. 6E, in an embodiment the ADLP 600, 700 includes one or more power sources 680, 685; a power distribution/recharging unit 706; at least one processing unit 710; a display device 650; possibly a set of cameras 654; a sensing subsystem 718, which can include one or more types of sensors such as a level sensor 604, a moisture sensor 605, a geolocation sensor 706 configured for sensing or determining a current ADLP geolocation (e.g., and which can output a set of 2D or 3D geolocation coordinates), a first set of pressure sensors 646 configured for sensing the presence or absence and/or weight of a parcel or object on the landing mat 620, and/or a second set of pressure sensors 708 configured for sensing barometric pressure by which a current ADLP elevation or altitude can be estimated, determined, or output; one or more data network/data communication interfaces or ports 690 (e.g., one or more Ethernet, Universal Serial Bus (USB), and/or other types of interfaces or ports); and a guiding signal unit 725 that controls the generation or output of local RF and/or optical guidance signals by way of RF guiding signal antennas 660 and visible/IR guiding signal light sources 670, respectively. The ADLP 600, 700 further includes a communication subsystem 730, which can include a SIM card interface unit 732 coupled to a cellular network communication unit 734 (e.g., which includes a cellular modem); a non-cellular wireless data network communication unit 736, which can include one or more short range wireless data network communication devices 692 mentioned above; and/or a wire-based data network communication unit 738, which can include a conventional data network interface unit. The ADLP 600, 700 can further include a data storage unit 740, such as a solid state disk drive; and a memory 800. Each element of the ADLP 600, 700 can be coupled to a set of signal/data communication pathways such as one or more buses 701.

As indicated in FIG. 6F, in an embodiment the ADLP memory 800 includes a boot/initialization module 801, an operating system 802, and a plurality of modules that include program instruction sets executable by the ADLP's processing unit 710 for managing or controlling the operation of particular ADLP resources (e.g., hardware resources) or subsystems. Such modules can include an I/O management module 812, possibly a display device management module 815, a camera management module 816, a sensor management module 818, a local guidance signals management module 822, possibly a cellular network communication management module 834, a non-cellular wireless network communication management module 836, possibly a wire-based network communication management module 838, a data storage management module 840, an app memory 850, and a working memory 860. An ADLP parcel delivery/pickup management module or app 852 resides in the app memory 850, and includes program instruction sets executable by the ADLP's processing unit 710 for managing, controlling, and/or performing ADLP parcel delivery and pickup operations as further detailed below with reference to FIGS. 8A-11B.

Figure 6G:
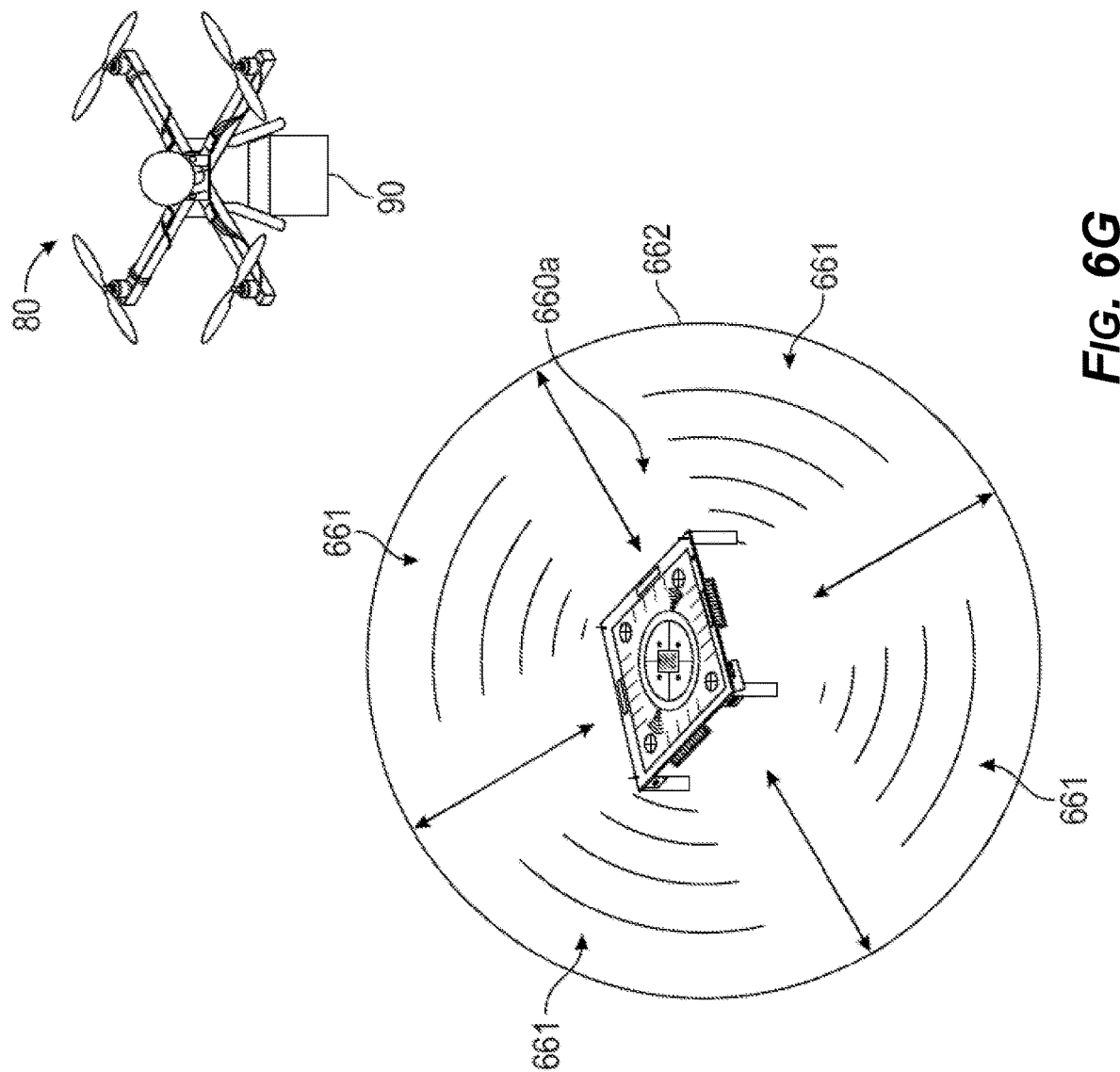
FIG. 6G is a schematic illustration of a representative aerial drone carrying a parcel and approaching an ADLP such as the ADLP of FIG. 6A for parcel delivery thereto, and representative local guidance signals output by the ADLP to aid aerial drone guidance to a target landing zone on a landing mat of the ADLP in accordance with an embodiment of the present disclosure.

FIG. 6G is a schematic illustration of a representative aerial drone 80 carrying a parcel 90 and approaching an ADLP 600 in accordance with an embodiment of the disclosure, such as the ADLP 600a of FIG. 6A, for parcel delivery thereto, and representative local RF guiding signals 661 output by the ADLP 600a within a local RF guiding signal region 662 corresponding to the ADLP 600 (e.g., across or within a 10-75 meter radius of the ADLP 600a) to aid aerial drone recognition, identification, or localization of the ADLP 600a, and aerial drone guidance to the central parcel deposit zone 640 on the ADLP's mat 620.

Aspects of Representative Image Assisted Aerial Drone Localization

In some embodiments, during an aerial drone's approach to a site or building corresponding to an expected location at which an ADLP 600 targeted for parcel delivery or pickup resides, a camera carried by the aerial drone can capture one or more current in-flight images of this site or building at particular or predetermined aerial drone reference geospatial coordinates, reference altitudes/elevations, and reference compass headings or compass-based view directions. The contents of a given current in-flight image can be compared (e.g., by way of image processing techniques or operations) to at least one reference ADLP location image that (a) was previously captured at the same or essentially the same aerial drone reference geospatial coordinates, reference altitude/elevation, and reference compass heading as the current in-flight image under consideration, and (b) corresponds to a successful parcel delivery or pickup event at the target ADLP 600 to aid (i) confirmation of the target ADLP's location, and/or (ii) aerial drone flight path adjustments. A simplified non-limiting representative example of such image aided localization of a target ADLP 600 is described hereafter.

Prior to aerial drone dispatch to a particular target ADLP 600 at which parcel delivery or pickup operations are to occur, an aerial drone service provider 82 can obtain from the aerial drone parcel transfer management server(s) 100 at least one reference image capture location definition corresponding to the target ADLP 600. Each reference image capture location definition includes a set of reference geospatial coordinates, a reference altitude/elevation (which can be part of the reference geospatial coordinates in the event that such geospatial coordinates are 3D coordinates), and a reference compass heading. The reference image capture location definition can form part of the adjunctive ADLP location data corresponding to the target ADLP 600. Once the aerial drone arrives at a given reference image capture location along its flight path to the target ADLP 600, the aerial drone captures a current in-flight image, and transfers this in-flight image to the aerial drone service provider 82 and/or the aerial drone parcel transfer management server(s) 100.

In the event that one or more previously captured reference images exist in the ADLP location image database(s) 900 corresponding to (a) the reference image capture location under consideration, and (a) prior successful parcel delivery to or pickup from the target ADLP 600 under consideration, the aerial drone parcel transfer management server(s) 100 can perform image processing operations by which objects, object outlines, structural details, and/or features in the current in-flight image are compared with objects, object outlines, structural details, and/or features in the reference image(s). Depending upon whether such comparison indicates that a match or likely match between a site or building or portions thereof corresponding to the target ADLP 600 in the current in-flight image and the reference image(s), the ADLP 600 can issue an image match notification or an image mismatch notification to the aerial drone service provider 80. In response to an image match notification, the aerial drone can continue along its flight path to the target ADLP 600 or navigate thereto; and in response to an image mismatch notification, the aerial drone service provider 82 can make an aerial drone flight path adjustment or revision. Additionally or alternatively, the current in-flight image and the reference image(s), and/or at least one composite or comparison image corresponding formed therefrom, can be presented to a human aerial drone operator for purpose of aiding confirmation that the aerial drone's flight path is correct and/or the aerial drone is in proximity to the target ADLP 600.

Figure 7:
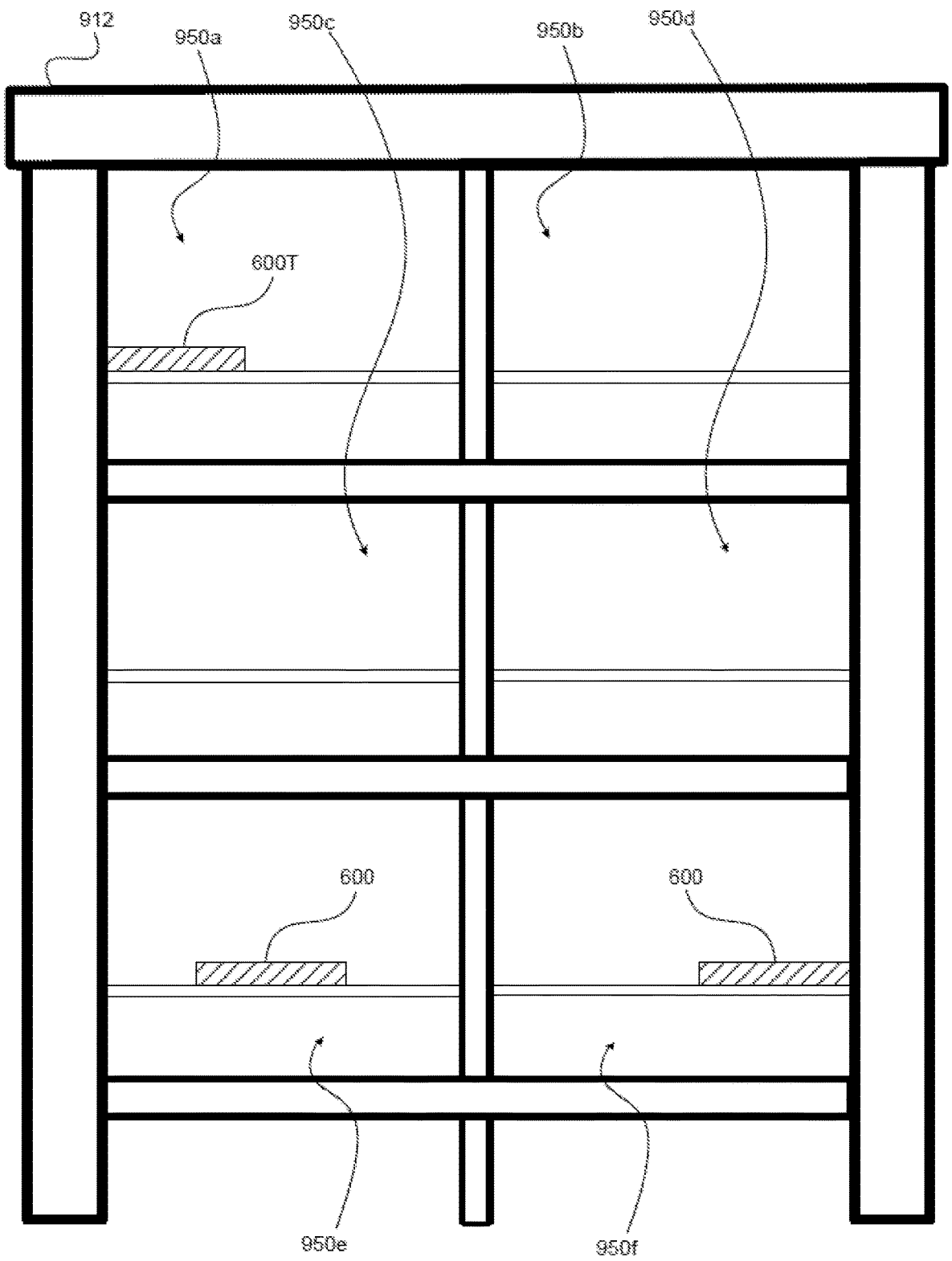
FIG. 7 is a schematic illustration of a condominium complex image that is analyzable or processable to aid verification of an ADLP location in accordance with an embodiment of the present disclosure.

Further to the foregoing, in a number of embodiments the aforementioned image processing operations can determine, identify, or recognize a particular image space location (e.g., a pixel area or region within the current in-flight image) corresponding to a physical space location at which the target ADLP 600 resides or is expected to reside. For instance, FIG. 7 is a schematic illustration of a representative current in-flight image 910 that includes portions of a condominium or apartment complex 912, where the in-flight image 910 is viewable, analyzable, or processable to aid verification of an ADLP location or ADLP localization in accordance with an embodiment of the present disclosure. The image processing operations can identify or recognize structural outlines, boundaries, or borders between each of multiple residential units 950a-f in the complex 912, and in certain embodiments can further determine whether particular image features corresponding to a particular residential unit 950a indicate the presence or location of the target ADLP 600T thereat (i.e., at the residential unit 950a).

Each reference image in the ADLP location image database(s) 900 can be tagged with an ADLP address, a date, a time of day, and possibly other data (e.g., weather condition descriptors). The time of day tag enables the comparison of a current in-flight image captured at a particular time of day with a reference image captured at a similar time of day.

After an image match notification has been generated and successful parcel delivery to or pickup from the target ADLP 600 under consideration has occurred, the current in-flight image(s) captured while the aerial drone was en route to the target ADLP can be tagged as set forth above, and stored in the ADLP location image database(s) 900, in a manner readily understood by individuals having ordinary skill in the relevant art.

Aspects of Aerial Drone Parcel Transfer Processes

Particular aspects of representative aerial drone parcel transfer management processes and parcel delivery/pickup operations, including parcel delivery and/or pickup operations performed or performable by an ADLP 600 in association with aerial drone recognition, identification, and localization of the ADLP 600 and parcel delivery thereto or pickup therefrom, are described in detail hereafter with respect to FIGS. 8A-11B.

Figures 8A, 8B:
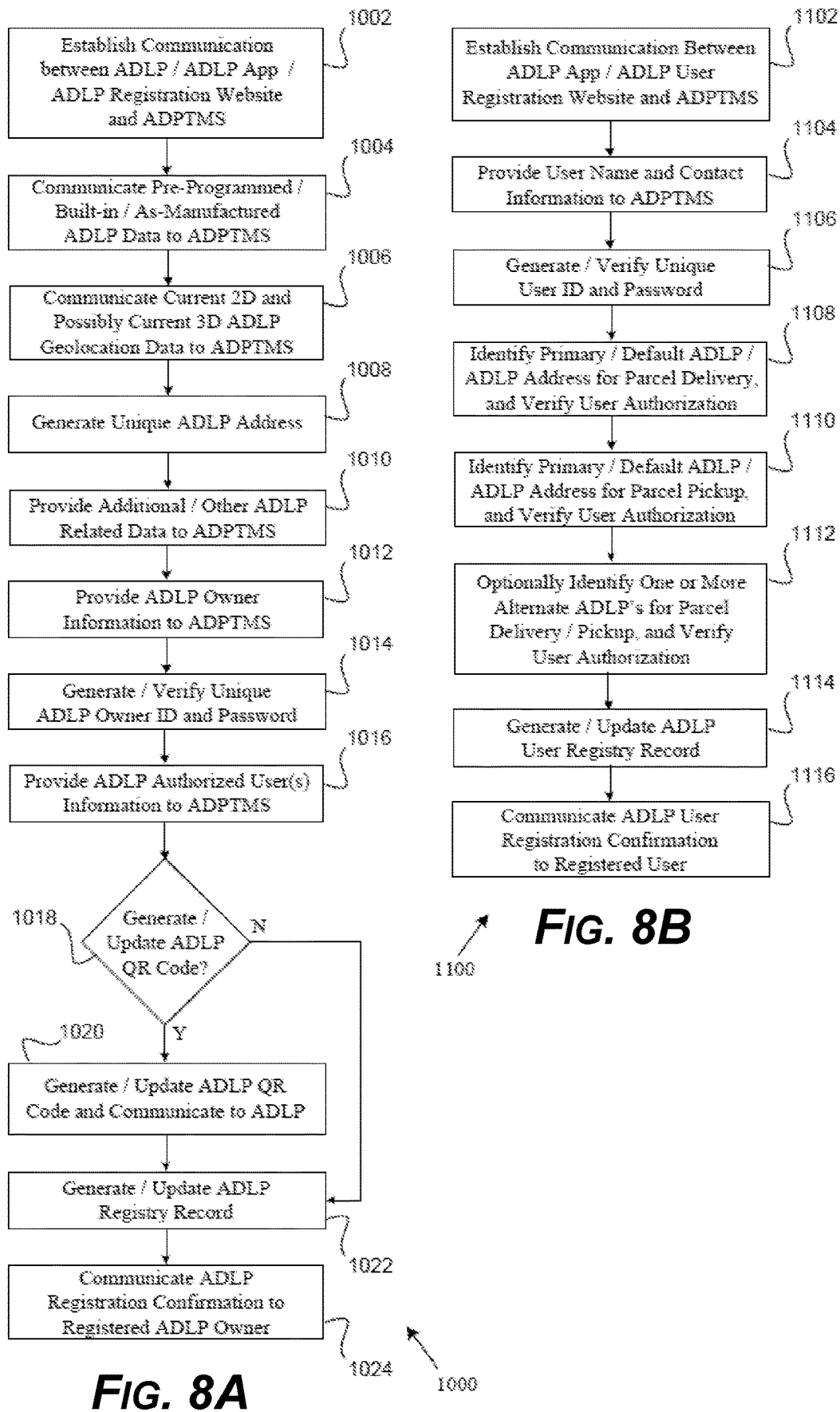
FIG. 8A is a flow diagram showing aspects of a representative ADLP and ADLP owner registration process in accordance with an embodiment of the present disclosure.
FIG. 8B is a flow diagram showing aspects of a representative ADLP user registration process in accordance with an embodiment of the present disclosure.

FIG. 8A is a flow diagram showing aspects of a representative ADLP and ADLP owner registration process 1000 in accordance with particular embodiments of the present disclosure, which in an embodiment encompasses some or each of process portions 1002-1024. A first process portion 1002 involves or includes establishing network communication between an aerial drone parcel transfer management server (hereafter ADPTMS for purpose of brevity) 100 and at least one of (a) a specific ADLP 600 (for instance, a previously unregistered ADLP 600, or an already registered ADLP 600 for which registration data needs to be updated, e.g., after the ADLP 600 has been disposed at or transported to a new geolocation); (b) an ADLP management app 552 executing on a user computing/electronic device 400 such as a mobile telephone or other type of portable device (e.g., a tablet or pad-type computing device) in close or very close proximity to the ADLP 600, and which is configured for communication with the ADLP 600 by way of a wire-based or wireless link; and (c) an ADLP registration website.

A second process portion 1004 involves communicating or transferring pre-programmed, built-in, and/or as-manufactured ADLP information or data to the ADPTMS 100, where such data typically includes the ADLP's manufacturing serial number. In various embodiments, the ADLP 600 or the ADLP management app 552 automatically communicates such data to the ADPTMS 100. Alternatively, such data can be manually input to a visual interface (e.g., corresponding to the ADLP management app 552 or the ADLP registration website) and subsequently communicated to the ADPTMS 100. In some embodiments, particular pre-programmed, built-in, and/or as-manufactured ADLP data, such as the ADLP's manufacturing serial number, initial ADLP configuration data, and ADLP parcel handling capability data, is incorporated into the ADLP's QR code (e.g., an initial QR code) 652 in association with or at the time of ADLP manufacture. Consequently, depending upon embedment details the ADLP 600 itself can communicate this QR code 652 to the ADPTMS 100, or the ADLP management app 552 executing on the mobile device 400 in proximity to the ADLP 600 can capture an image of the QR code 652 by way of the mobile device's camera, and the ADLP management app 552 can communicate the QR code 652 to the ADPTMS 100.

A third process portion 1006 involves communicating current 2D or possibly 3D geolocation data (e.g., a set of 2D or 3D geolocation coordinates) corresponding to the current 2D or 3D physical location of the ADLP 600 to the ADPTMS 100. The third process portion 1006 can include communicating (a) 2D or 3D GPS coordinates from the ADLP's geolocation sensor 706 to the ADPTMS 100, and/or (b) communicating 2D or 3D GPS coordinates that the ADLP management app 552 obtains from an elevation/altitude sensor carried by the mobile telephone 400 itself to the ADPTMS 100 (e.g., in association with the ADLP management app 552 instructing the ADLP owner to place their mobile telephone 400 directly above and adjacent to the ADLP's landing mat 620).

A fourth process portion 1008 involves the generation of a unique ADLP address corresponding to the ADLP 600 under consideration, such as an ADLP address defined in accordance with a predetermined or standard format described above. Depending upon embodiment details, the ADLP address can include or reference a unique numerical or alpha-numeric code corresponding to the ADLP 600 under consideration, as well as the ADLP's current or most-recent geospatial location (e.g., as specified by 2D or 3D geolocation data).

A fifth process portion 1010 can involve the provision of additional/adjunctive/other ADLP related data to the ADPTMS 100, including an ADLP type data designating the categorical type(s) of parties, entities, or individuals that are authorized to use the ADLP 600 (e.g., indicating whether the ADLP 600 is designated as private—single residence use; shared—multi-residence use; private—single business/corporate use; shared—multi-business/corporate use; public—post office use; public—shipping/receiving business use; public—educational institution use; private—educational institution use; public—library use; or private—other government agency use). The additional/adjunctive/other ADLP related data can also include ADLP configuration/capabilities data as set forth above, such as the dimensions of the ADLP's landing mat 620, the ADLP's parcel handling capability (e.g., maximum parcel dimensions and maximum parcel weight), and/or a postal code within which the ADLP 600 resides (e.g., which the ADLP management app 552 or the ADPTMS 100 automatically retrieve from an online database in accordance with the current geolocation data provided to the ADPTMS 100, or which can be manually input to the ADLP management app 552 and communicated to the ADPTMS 100).

A sixth process portion 1012 involves providing or receiving ADLP owner information to the ADPTMS, including owner contact information such as at least one phone number (e.g., a mobile telephone number) and e-mail address corresponding to the ADLP owner, and the ADLP owner's mailing address. A seventh process portion 1014 involves receiving or generating and verifying a unique ADLP owner ID and password. An eighth process portion 1016 involves providing or identifying one or more ADLP authorized users to the ADPTMS 100 (e.g., by way of indicating the user ID(s) of particular registered system users). If no registered users for the ADLP 600 under consideration exist, the owner of this ADLP 600 can become the first registered user thereof by way of a user registration process such as that described below with reference to FIG. 8B.

In a ninth process portion 1018 corresponding to certain embodiments in which the ADLP 600 can present its QR code 652 by way of an electronic display device such as a flat panel display, the ADPTMS 100 can determine whether the ADLP's QR code 652 requires generation, regeneration, or updating, such as to indicate or incorporate therein the ADLP's current or most-recent geolocation data. If so, a tenth process portion 1020 involves generating, regenerating, or updating this ADLP's QR code 652, and communicating the generated, regenerated, or updated QR code 652 to the ADLP 600.

After the tenth process portion 1020, or after the eight process portion 1016 in the event that no operations directed to the ADLP's QR code 652 are needed, an eleventh process portion 1022 involves generating or updating and ADLP registry record 312 corresponding to the ADLP 600. A twelfth process portion 1024 can involve communicating an ADLP registration confirmation and possibly associated ADLP registration data to the ADLP owner, such as by way of an e-mail or simple messaging service (SMS) message.

FIG. 8B is a flow diagram showing aspects of a representative ADLP user registration process 1100 in accordance with particular embodiments of the present disclosure, which in an embodiment encompasses some or each of process portions 1102-1116. A first process portion 1102 involves or includes establishing network communication between the ADPTMS 100 and the ADLP management app 552 or an ADLP user registration website. A second process portion 1104 involves providing user name and contact information to the ADPTMS 100 corresponding to a new previously unregistered system user, or an already registered system user whose registration information requires updating. A third process portion 1106 involves ADPTMS receipt or generation of a unique user ID and password. A fourth process portion 1108 involves identifying, selecting, or receiving a selection of a primary or default ADLP 600 and/or corresponding ADLP address for parcel delivery corresponding to the user under consideration, and verifying user authorization to receive parcels at this primary parcel delivery ADLP 600; and a fifth process portion 1110 involves identifying, selecting, or receiving a selection of a primary or default ADLP 600 and/or corresponding ADLP address for parcel pickup corresponding to this user, and verifying user authorization to provide parcels to this primary parcel pickup ADLP 600. A sixth process portion 1112 can optionally involve identifying one or more alternate ADLPs 600 for parcel delivery and/or pickup corresponding to this user, and verifying user authorization for such alternate ADLP(s) 600 for parcel delivery and/or pickup, accordingly. Verification of user authorization to use a specified or selected ADLP 600 for parcel delivery and/or pickup can involve, for instance, determination of whether the user ID corresponding to the user under consideration exists in a list of authorized users corresponding to this ADLP 600; and/or sending an e-mail or one-time authorization code to the owner of this ADLP 600, to which the ADLP owner must respond within a predetermined time interval to indicate user authorization.

Because some ADLPs 600 in accordance with embodiments of the present disclosure can have ADLP type data designating such ADLPs 600 as available or accessible for public use, in a number of embodiments no user authorization verification needs to be performed in response to user selection or identification of a publicly available ADLP 600, although such user authorization verification can be performed in certain embodiments. In specific embodiments, the ADPTMS 100 can automatically select a publicly available ADLP 600 as an initial primary or default ADLP 600 for parcel delivery and/or parcel pickup corresponding to the user based upon the user's address or postal code, to thereby identify at least one ADLP 600 near the user's home or work address at which the user once registered can receive and/or provide parcels.

A seventh process portion 1114 involves generating or updating an ADLP user registry record 332 corresponding to the user under consideration, and an eighth process portion 1116 can involve communicating an ADLP user registration confirmation to this registered user, such as by way of e-mail or sms message. The ADLP user registration confirmation can include particular user registration data, such as the registered user's ID and identification of the registered user's primary parcel delivery and/pickup ADLPs 600.

Figure 9:
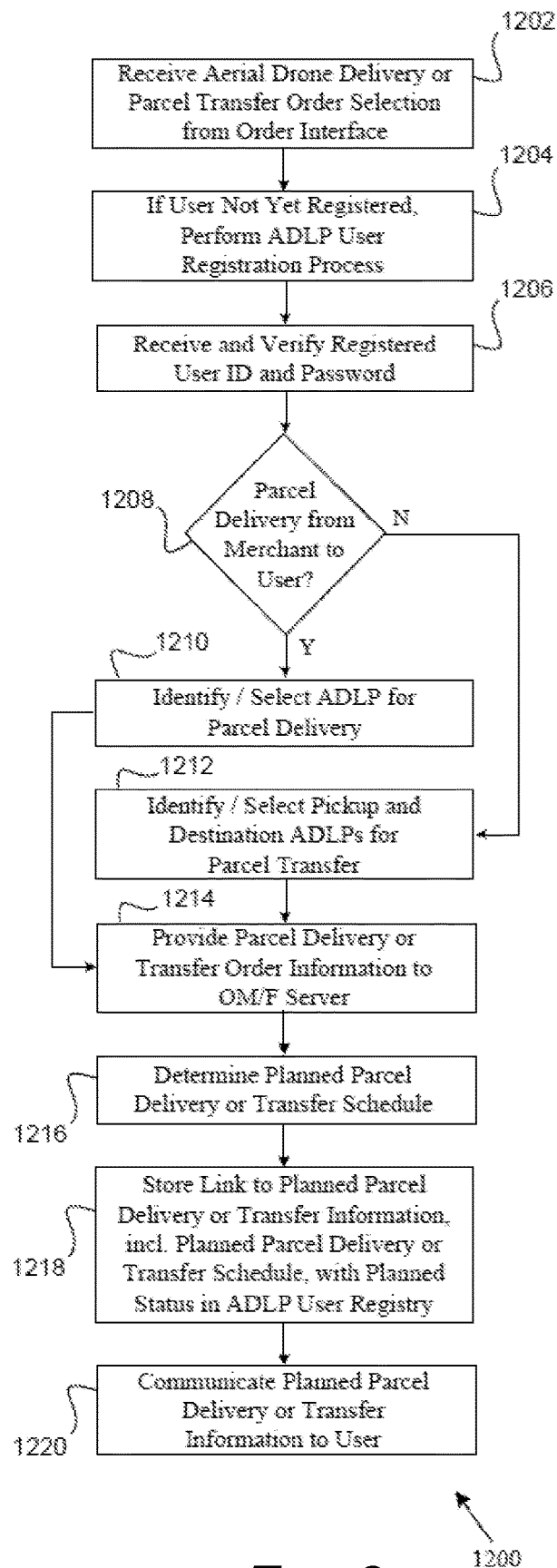
FIG. 9 is a flow diagram showing aspects of representative aerial drone parcel delivery or pickup order processing operations in accordance with an embodiment of the present disclosure.

FIG. 9 is a flow diagram showing aspects of representative aerial drone parcel delivery or pickup order processing operations 1200 in accordance with particular embodiments of the present disclosure, which in an embodiment encompasses some or each of process portions 1202-1220. A first process portion 1202 involves or includes receiving an aerial drone delivery or parcel transfer order selection corresponding to an online order placed by a user by way of an online order interface, such as a visual interface (e.g., a GUI) provided in association with or by way of an online store 20. A second process portion 1204 involves performing an ADLP user registration process, such as set forth above with respect to FIG. 8B, if the system user is not yet a registered system user. A third process portion 1206 involves receiving and verifying a registered user ID and password.

A fourth process portion 1208 involves determining whether the current online order corresponds to an aerial drone parcel delivery from a predetermined product merchant in association with which the parcel originates from a known location such as a product warehouse or shipping center; an aerial drone parcel transfer order, in which the registered user needs to identify or select a source ADLP 600 from which a parcel can be picked up and a destination or target ADLP 600 to which the parcel is to be delivered. If the current online order corresponds to parcel delivery from a product merchant, a fifth process portion 1210 involves receiving user selection or indication of an ADLP 600 at which parcel delivery is desired or required. Otherwise, a sixth process portion 1212 involves receiving user selection or indication of a source ADLP 600 and a destination ADLP 600 between which an aerial drone will transfer the parcel.

After the fifth or sixth process portion 1210, 1212, a seventh process portion 1214 involves communicating or providing parcel delivery or transfer order information to an order management/fulfillment server 30, and an eighth process portion 1216 involves determining a planned aerial drone parcel delivery or transfer schedule, including a planned date and time on which parcel delivery or transfer will be initiated or completed. The eighth process portion 1216 can involve the order management/fulfillment server 30 accessing estimated or actual aerial drone schedule or booking information available from an aerial drone service provider 82, and possibly identifying an aerial drone service provider 82 that can provide parcel delivery or transfer in as short a time period as possible in view of aerial drone availability and parcel delivery or transfer distance. A ninth process portion 1218 involves storing a link to planned parcel delivery or transfer information corresponding to the online order under consideration, possibly in association with a "planned" status tag. A tenth process portion 1220 involves communicating planned parcel delivery or transfer information corresponding to this online order to the registered user.

Figure 10A:
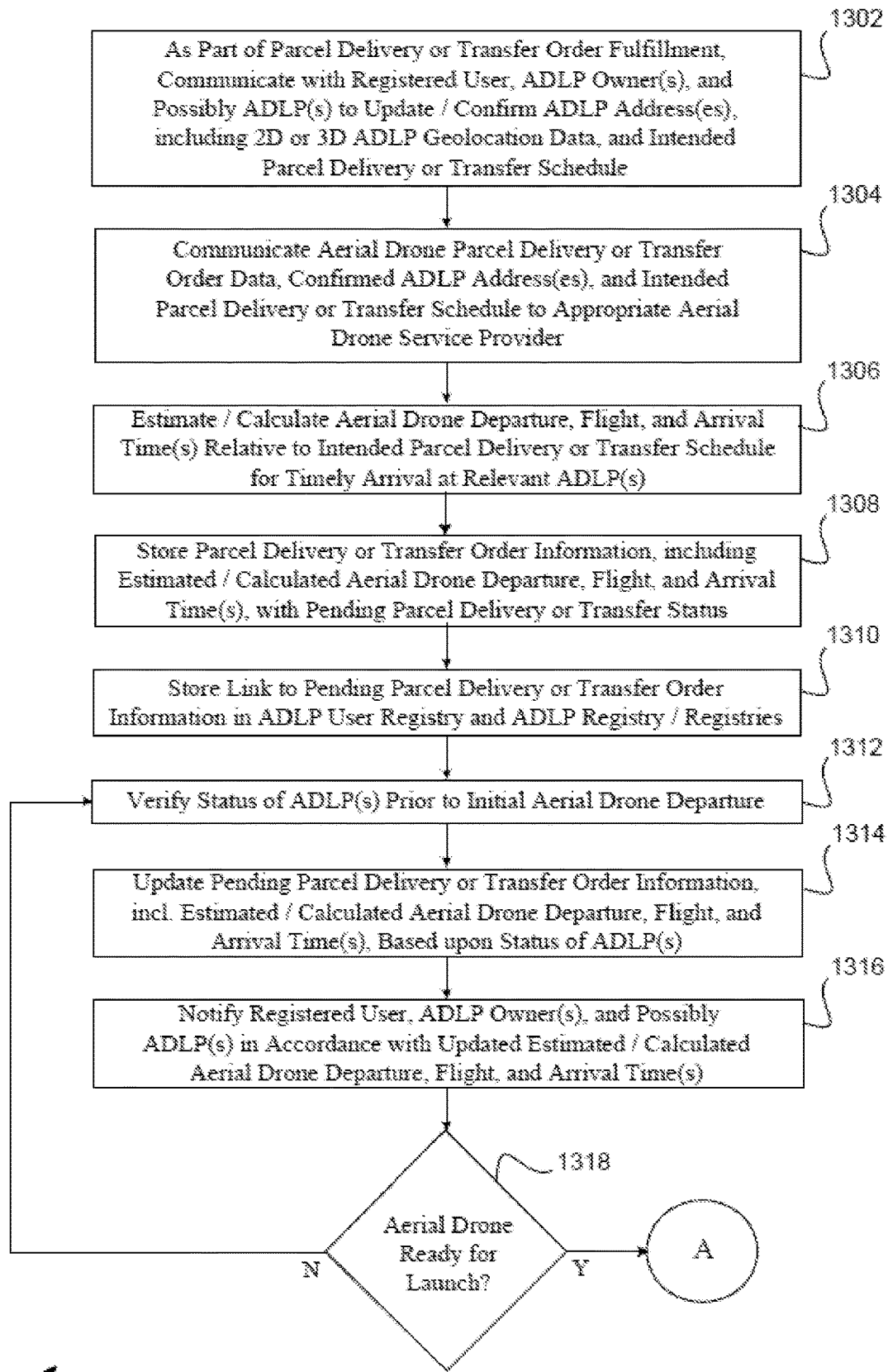
FIGS. 10A and 10B are flow diagrams showing aspects of a representative aerial drone parcel delivery or transfer process in accordance with an embodiment of the present disclosure.
Figure 10B:
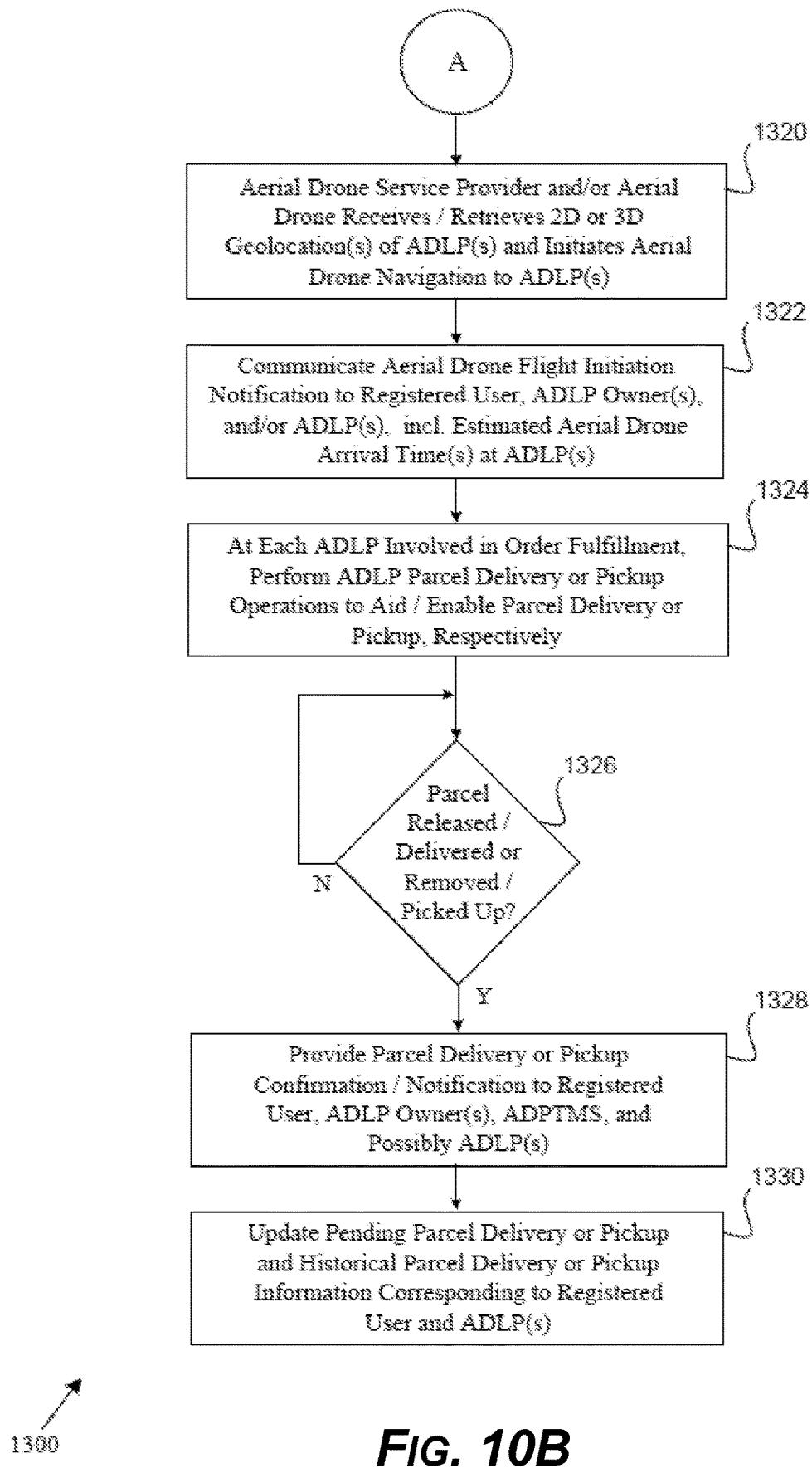

FIGS. 10A and 10B are flow diagrams showing aspects of a representative aerial drone parcel delivery or transfer process 1300 in accordance with particular embodiments of the present disclosure, which in an embodiment encompasses some or each of process portions 1302-1330. In association with fulfilling a given aerial drone parcel delivery or transfer order, a first process portion 1302 involves communicating with the registered user corresponding to the order, the ADLP owner(s) corresponding to the ADLP(s) 600 involved in fulfilling the order, and possibly the ADLP (s) themselves to update or confirm the ADLP address(es) (including 2D or 3D ADLP geolocation data) and an intended parcel delivery or transfer schedule for the order.

A second process portion 1304 involves communicating aerial drone parcel delivery or transfer order data, confirmed ADLP address information, and the intended parcel delivery or transfer schedule to an aerial drone service provider 82 assigned to managing or providing aerial drone services for the order under consideration. A third process portion 1306 involves the aerial drone service provider's estimating or calculating aerial drone departure, flight, and arrival times corresponding to or required for meeting the intended parcel delivery or transfer schedule for timely aerial drone interaction with the ADLP(s) corresponding to this order.

A fourth process portion 1308 involves storing parcel delivery or transfer information corresponding to this order as determined by the aerial drone service provider 82, including the estimated or calculated aerial drone departure, flight, and arrival times, with a pending status designation or tag (e.g., in a database associated with the aerial drone service provider 82); and a fifth process portion 1310 includes storing a link to this pending parcel delivery or transfer information in the ADLP user registry record 332 and the ADLP registry record 312 corresponding to this order.

A sixth process portion 1312 involves verifying the current or most-recent status of the ADLP(s) involved in fulfilling or carrying out this order prior to the estimated/calculated aerial drone departure time; and a seventh process portion 1314 involves updating pending parcel delivery or transfer information, including estimated/calculated aerial drone departure, flight, and arrival times, based upon the status of the ADLP(s) corresponding to this order. ADLP status information can be acquired by way of network communication with such ADLP(s). Because the ADLP address of each ADLP 600 involved in fulfilling the order under consideration is known, and each ADLP address indicates, establishes, or defines a specific geolocation corresponding to the spatial location of the ADLP 600 (e.g., an accurate, approximately/sufficiently accurate, or expected accurate, 3D geolocation for the ADLP 600), aerial drone flight and arrival times relative to a given aerial drone departure time can be estimated/calculated with enhanced or good accuracy.

An eighth process portion 1316 involves communicating a notification (e.g., by way of automatically generated e-mails and/or sms messages) to the registered user, the ADLP owner(s), and possibly the ADLP(s) corresponding to the order under consideration, where the notification references or indicates the updated estimated/calculated aerial drone departure, flight, and/or arrival time(s) corresponding to the ADLP(s) 600 involved in fulfilling this order. A ninth process portion 1318 involves determining whether aerial drone departure can occur, and hence whether aerial drone parcel delivery or transfer can be initiated. If not, the process 1300 can return to the sixth process portion 1312.

Following the ninth process portion 1318, a tenth process portion 1320 involves retrieval of the 2D or 3D geolocation(s) of the ADLP(s) corresponding to the order under consideration by the aerial drone service provider 82 and/or an aerial drone corresponding thereto, and initiation of aerial drone navigation to a source ADLP 600 from which parcel pickup is indicated or required, followed by aerial drone navigation to a destination ADLP 600 to which parcel delivery is indicated or required. An eleventh process portion 1322 involves communicating an aerial drone flight initiation notification to the registered user, the ADLP owner(s), and/or the ADLP(s) themselves corresponding to the order under consideration, which is actively being fulfilled by way of aerial drone transit.

A twelfth process portion 1324 involves performing ADLP parcel pickup or delivery operations at each ADLP 600 involved in fulfilling the order under consideration to respectively aid or enable parcel pickup from or delivery to the ADLP(s) 600. Representative ADLP parcel pickup and delivery operations are described in detail below with reference to FIGS. 11A-11B. A thirteenth process portion 1326 involves determining whether the parcel has been picked up from or delivered to the ADLP(s) involved in fulfilling the order under consideration; if not, the process 1300 can remain at the thirteenth process portion 1326. Otherwise, a fourteenth process portion 1328 involves providing a parcel delivery or pickup confirmation or notification to the registered user, the ADLP owner(s), the ADPTMS 100, and possibly the ADLP(s) 600 corresponding to the order under consideration. Such notification can occur by way of e-mail and/or sms messages. Finally, a fifteenth process portion 1330 involves updating pending parcel delivery or pickup information and historical parcel delivery or pickup information corresponding to the registered user and the ADLP(s) for this order.

Figure 11A:
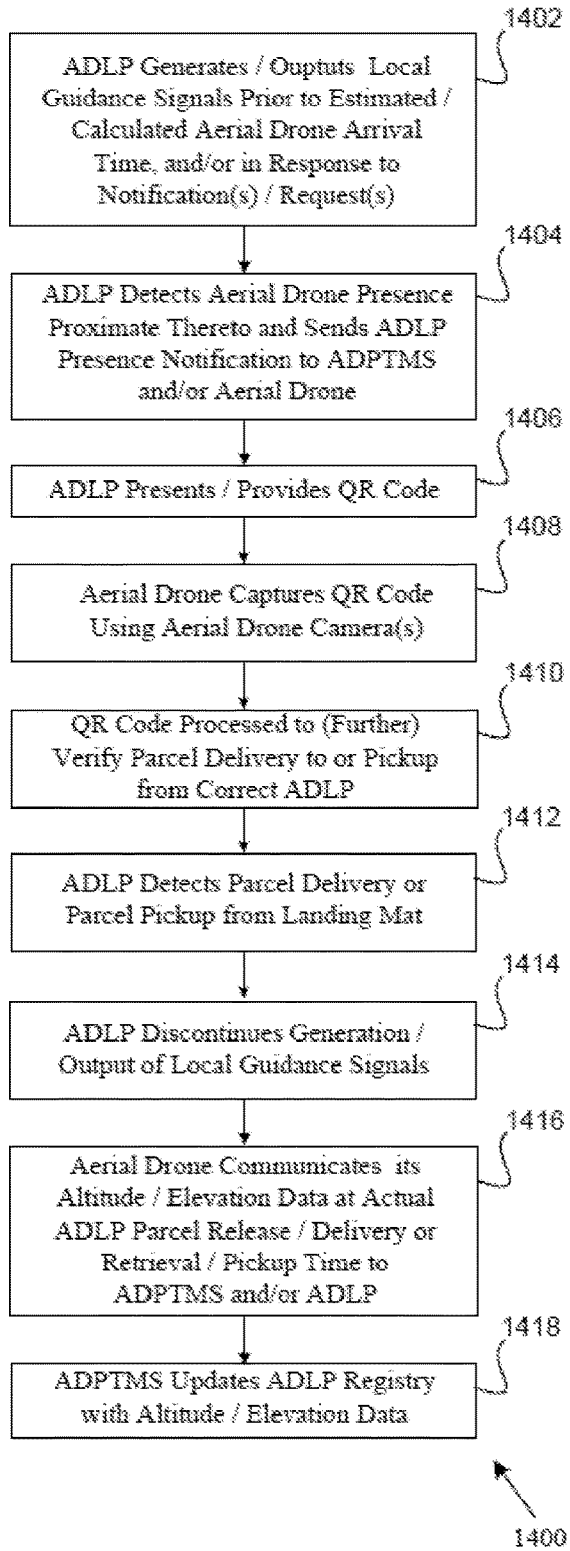
FIG. 11A is a flow diagram showing aspects of representative ADLP parcel delivery and/or pickup operations in accordance with an embodiment of the present disclosure.

FIG. 11A is a flow diagram showing aspects of representative ADLP parcel delivery and/or pickup operations 1400 in accordance with particular embodiments of the present disclosure, which in an embodiment includes some or each of process portions 1402-1418. In an embodiment, a first process portion 1402 involves ADLP generation or output of local guidance signals prior to an estimated/calculated aerial drone arrival time thereat, for instance, in response to the ADLP's receipt of a notification or request from the ADPTMS 100, an aerial drone service provider 82, and/or an aerial drone itself 80. Such local guidance signals can include RF and/or optical (e.g. infrared) guidance signals, as described above.

In some embodiments, a second process portion 1404 involves ADLP detection of aerial drone presence proximate to the ADLP 600, such as by way of capturing/monitoring audio signals in the ADLP's surrounding environment; and/or detecting RF and/or optical signals output by the aerial drone. A third process portion 1406 involves ADLP presentation of its QR code 652 in a manner that facilitates or enables QR code capture by the aerial drone, such as by presenting its QR code 652 on its landing mat 620, e.g., as indicted in FIGS. 6A-6C. A fourth process portion 1408 involves aerial drone capture of an image of the QR code using an aerial drone camera; and a fifth process portion 1410 involves processing the QR code to verify or further verify that the aerial drone is present at the correct or intended ADLP 600. Such QR code processing can be performed by way of communication between the aerial drone and the ADLP 600 under consideration, the ADPTMS 100, and/or one or more other computer systems (e.g., a computer system corresponding to the aerial drone service provider 82), in a manner readily understood by individuals having ordinary skill in the art.

A sixth process portion 1412 involves ADLP detection or parcel delivery to or parcel pickup from its landing mat 620, after which a seventh process portion 1414 involves ADLP terminating the provision of local guidance signals. In some embodiments, an eighth process portion 1416 involves aerial drone communication of altitude or elevation data to the ADPTMS 100 and/or the ADLP 600, where such altitude or elevation data corresponds to or is tagged with the time at which the aerial drone delivered the parcel to or picked up the parcel from the ADLP's landing mat 620; and a ninth process portion 1418 involves ADPTMS updating of the ADLP's registry record 312 with such altitude or elevation data. Such altitude or elevation data can confirm or establish the ADLP's current or most-recent altitude or elevation, and in some situations can be incorporated into or associated with the ADLP's address (e.g., in the event that the aerial drone's altimeter was recently calibrated or likely calibrated, such as in accordance with a calibration schedule associated with the aerial drone service provider 82), and can thus aid future accurate ADLP localization operations.

Figure 11B:
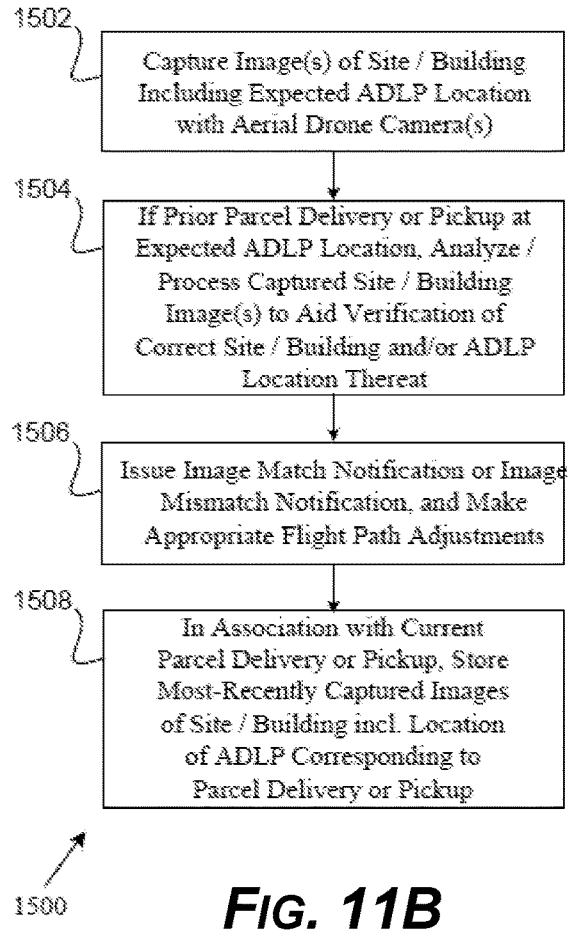
FIG. 11B is a flow diagram showing further aspects of representative ADLP parcel delivery and/or pickup operations, corresponding to portions of an image-based ADLP location identification assistance technique in accordance with an embodiment of the present disclosure.

FIG. 11B is a flow diagram showing further aspects of representative ADLP parcel delivery and/or pickup operations 1500 corresponding to portions of an image-based ADLP location identification assistance process in accordance with particular embodiments of the present disclosure, which in an embodiment encompass process portions 1502-1508. In an embodiment, a first process portion 1502 involves aerial drone capture of a set of current in-flight images of a site or building at which an ADLP 600 under consideration is expected to reside, where each in-flight image capture occurs in accordance with a reference image capture definition as set forth above.

A second process portion 1504 involves processing or analyzing each captured in-flight image relative to a reference image corresponding to the reference image capture definition under consideration, the ADLP 600 under consideration, and successful parcel delivery thereto or pickup therefrom, to determine whether the site or building matches the expected location of the ADLP 600. A third process portion 1506 involves issuing an image match notification or image mismatch notification to the aerial drone service provider 82 based upon such image processing or analysis. In the event that the current parcel delivery or pickup operations involving this ADLP 600 are successful, a fourth process portion 1508 involves storing the current in-flight captured image(s) as reference images in the ADLP image location database(s) 900.

Figure 12:
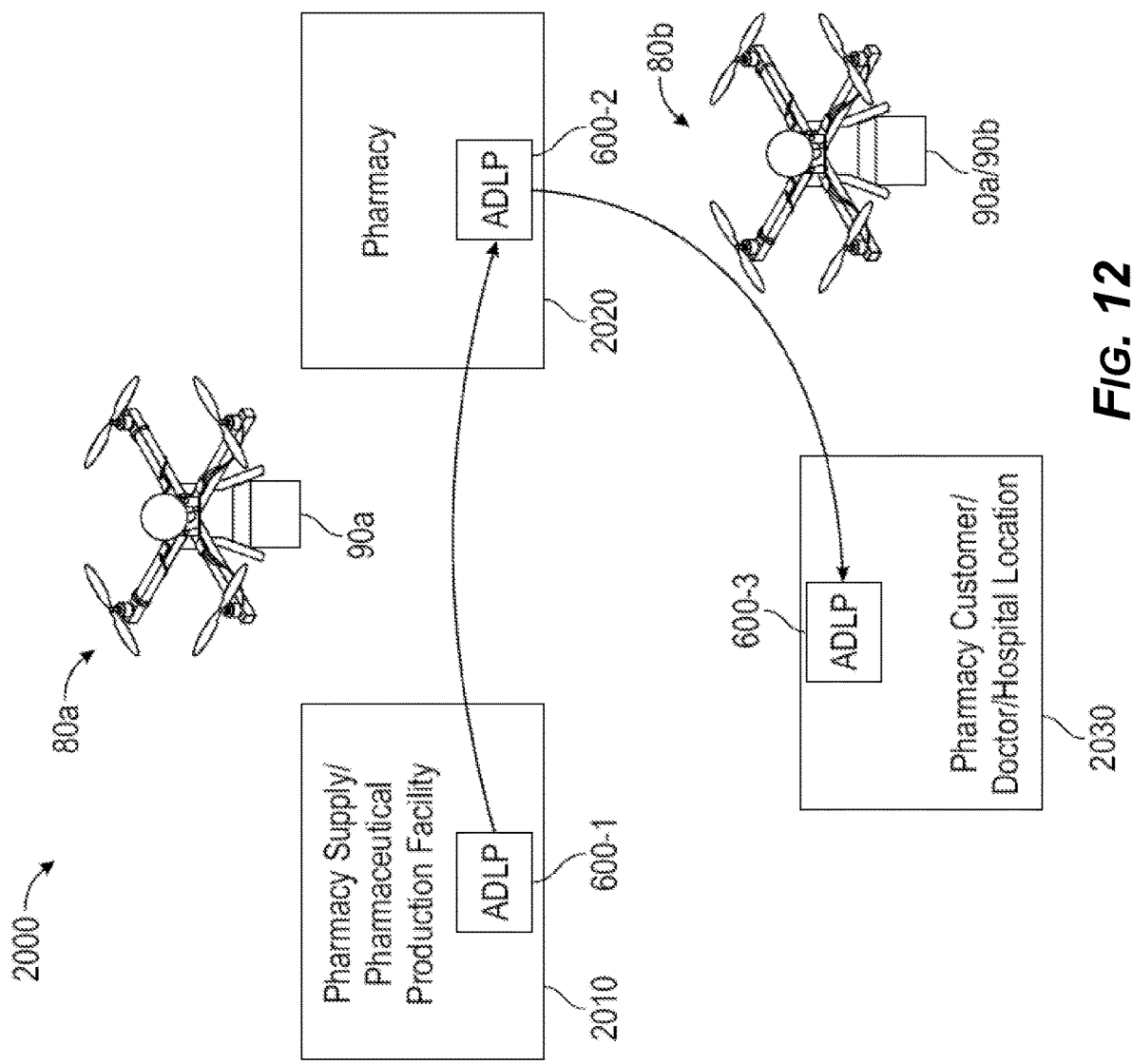
FIG. 12 is a schematic illustration of a representative multi-stage aerial drone parcel transfer sequence in accordance with an embodiment of the present disclosure.

Further Aspects of Representative Parcel Transfer or Pickup and Delivery Scenarios FIG. 12 is a schematic illustration of a representative multi-stage or multi-hop aerial drone parcel transfer scenario or sequence 2000 in accordance with an embodiment of the present disclosure. In accordance with such a multi-stage aerial drone parcel transfer scenario 2000, at least one parcel or package 90*a,b* can be transferred from an origin or source pickup ADLP 600-1 to one or more delivery or destination ADLPs 600-2, 600-3, including a first or intermediary destination ADLP 600-2 and a second or final destination ADLP 600-3, where each intermediary destination ADLP 600-2 also serves as a subsequent intermediary aerial drone pickup location prior to aerial drone parcel delivery to the final destination ADLP 600-3.

For instance, in accordance with a particular representative scenario 2000, a first registered ADLP user such as a consumer, a doctor, or a hospital can place a first order with an online store 20 associated with a pharmacy 2020 for a particular pharmaceutical product, and can select aerial drone delivery for the first order during a first online order check-out procedure. In association with the first online order check-out procedure, the first registered ADLP user can be presented with a visual interface (e.g., displayed by a web browser) by which they can select a destination ADLP 600-3 at which they are authorized to receive parcel deliveries, and to which the pharmaceutical product is to be delivered by aerial drone (e.g., as soon as possible (ASAP)). This destination ADLP 600-3 can be, for instance, located at or near consumer, doctor, or hospital property or premises 2030. The ADLP address of this destination ADLP 600-3 can be stored as part of the first order details.

If the pharmacy 2020 does not have the pharmaceutical product in stock (or a sufficient quantity thereof to satisfy the first order), a second registered ADLP user such as a pharmacy employee can place a second order for the pharmaceutical product with an online store 20 associated with a pharmacy supply company or pharmaceutical production facility 2010, and can select aerial drone delivery for the second order during a second online order check-out procedure. In association with the second online order check-out procedure, the second registered ADLP user can be presented with a visual interface (e.g., using a web browser) by which they can select a destination ADLP 600-2 at which they are authorized to receive parcel deliveries, and to which the pharmaceutical product is to be delivered (e.g., as soon as possible (ASAP)). The destination ADLP 600-2 corresponding to the second order can be, for instance, located on pharmacy property or premises, such as adjacent to or on the rooftop of a pharmacy building. The ADLP address of the destination ADLP 600-2 corresponding to the second order can be stored as part of the second order details.

In association with fulfilling the second order, at a confirmed date and time corresponding to the second order, an aerial drone service provider 82 can dispatch an aerial drone 80a to pick up a parcel 90a containing the pharmaceutical product from an ADLP 600-1 corresponding to the pharmacy supply company or pharmaceutical production facility 2010. The aerial drone 80a can deliver the parcel 90a to the destination ADLP 600-2 corresponding to the second order, e.g., the ADLP 600-2 located on pharmacy property or premises, in accordance with the ADLP address of this destination ADLP 600-2.

In association with fulfilling the first order after the second order has been fulfilled, at a confirmed date and time corresponding to the second order, the same or a different aerial drone service provider 82 can dispatch an aerial drone 80b to pick up the same parcel 90a or a different parcel 90b containing the pharmaceutical product from the ADLP 600-2 corresponding to the pharmacy facility 2020. The aerial drone 80a can deliver the parcel 90a/b to the destination ADLP 600-3 corresponding to the first order, e.g., the ADLP 600-2 located on consumer, doctor, or hospital premises, in accordance with the ADLP address of this destination ADLP 600-3.

Aspects of particular embodiments of the present disclosure address at least one aspect, problem, limitation, and/or disadvantage associated with existing systems and processes for managing aerial drone parcel deliveries and/or transfers. While features, aspects, and/or advantages associated with certain embodiments have been described in this disclosure, other embodiments may also exhibit such features, aspects, and/or advantages, and not all embodiments need necessarily exhibit such features, aspects, and/or advantages to fall within the scope of the present disclosure. It will be appreciated by a person of ordinary skill in the art that particular aspects of the above-disclosed systems, devices, components, processes, or alternatives thereof can be combined into other different systems, devices, components, processes, and/or applications. In addition, by a person having ordinary skill in the art can make various modifications, alterations, and/or improvements to one or more embodiments disclosed herein, where such modifications, alterations, and/or improvements remain within the scope of the present disclosure and the claims set forth below.

The invention claimed is:

1. A system for managing aerial drone parcel deliveries and/or or aerial drone parcel pickups, comprising:
   a plurality of geographically distributed aerial drone landing pads (ADLPs), each ADLP comprising a landing surface configured for supporting a parcel containing merchandise, products, or goods (a) received from an aerial drone during parcel delivery from the aerial drone onto the landing surface of the ADLP, or (b) provided to the aerial drone during parcel pickup by the aerial drone from the landing surface of the ADLP;
   a control unit corresponding to each ADLP, the control unit configured for data communication with at least one of a computing device external to the ADLP and a set of data communication networks including the Internet;
   a geolocation unit corresponding to each ADLP, the geolocation unit configured for communication with the control unit and further configured for providing geolocation data indicating a two dimensional (2D) geospatial location of the ADLP as well as an elevation at which the landing surface of the ADLP or the ADLP control unit resides during an ADLP registration procedure;
   a first network communication unit corresponding to each ADLP, the first network communication unit configured for communication with the ADLP control unit and configured for data communication by way of the set of data communication networks;
   a database coupled to the set of networks; and
   an aerial drone parcel transfer management server (ADPTMS) remote from the plurality ADLPs, the ADPTMS comprising:
      a processing unit;
      a second network communication unit coupled to the processing unit and the set of data communication networks; and
      a memory coupled to the processing unit and storing program instructions that when executed by the processing unit cause the processing unit to perform portions of the ADLP registration procedure for each ADLP within the plurality of ADLPs, including:
         establishing or confirming data communication with the control unit corresponding to the ADLP by way of the set of data networks;
         receiving geolocation data from the control unit corresponding to the ADLP;
         generating or receiving a unique ADLP address for the ADLP, the ADLP address comprising a unique identifier corresponding to the ADLP as well as the geolocation data provided by the geolocation unit corresponding to the ADLP;

determining a categorical type for the ADLP, which indicates whether the ADLP is for private use or public use; and storing in the database an ADLP record corresponding to the ADLP, wherein the ADLP record includes the unique ADLP address for the ADLP, wherein:

(a) the plurality of ADLPs includes (i) a first plurality of ADLPs each having an ADLP record with a categorical type indicating that the ADLP is for private use, and (ii) a second plurality of ADLPs each having an ADLP record with a categorical type indicating that the ADLP is for public use;

(b) the unique identifier corresponding to each ADLP (i) comprises as-manufactured information corresponding to the ALP and is communicated by the control unit corresponding to the ADLP to the ADPTMS, or (ii) is generated by the ADPTMS and is communicated by the ADPTMS to the control unit corresponding to the ADLP; and (c) the landing surface of each ADLP in the plurality of ADLPs presents a first Quick Response (QR) code that (i) includes or encodes the unique identifier corresponding to the ADLP, and (ii) is detectable, recognizable, and/or capturable by the aerial drone.

2. The system of claim 1, wherein the plurality of ADLPs includes a particular ADLP, wherein the system further comprises an altimeter configured to provide elevation data indicating a current or most-recent elevation of the landing surface of the particular ADLP, and wherein the altimeter is carried by one of (a) a mobile telephone disposed proximate to the landing surface of the particular ADLP and having a processing unit executing program instructions comprising an ADLP management app configured for communicating the elevation data to the control unit corresponding to the particular ADLP and/or the ADPTMS, and (b) an aerial drone configured for communicating the elevation data to the ADPTMS and/or the control unit corresponding to the particular ADLP as part of aerial drone parcel delivery to or parcel pickup from the landing surface of the particular ADLP.

3. The system of claim 2, wherein the first QR code presented by the landing surface of the particular ADLP additionally indicates or incorporates therein the elevation data for the particular ADLP.

4. The system of claim 1, wherein the particular ADLP further comprises an electronic display device having a display area configured for presenting the first QR code, and wherein the landing surface of the particular ADLP surrounds portions of the display area of the electronic display device.

5. The system of claim 4, wherein the memory of the ADPTMS stores program instructions which when executed by the processing unit of the ADPTMS cause the ADPTMS to generate a second QR code corresponding to the particular ADLP, and communicate the second QR code to the control unit of the particular ADLP, wherein the second QR code is distinct from the first QR code, wherein the second QR code encodes information corresponding to or identifying a parcel currently in transit to the particular ADLP by way of aerial drone parcel delivery, and wherein the portion of the electronic display device surrounded by the landing surface of the particular ADLP are configured for initially presenting the first QR code, and presenting the second QR code following communication of the second QR code to the control unit of the particular ADLP.

6. The system of claim 1, wherein the plurality of ADLPs includes a particular ADLP, and wherein the system comprises a mobile telephone positionable over the landing surface of the particular ADLP, the mobile telephone comprising:

an image capture device configured for capturing an image of the first QR code of the particular ADLP; and a processing unit executing program instructions comprising an ADLP management app configured for communicating data corresponding to the image of the first QR code to the ADPTMS or the control unit corresponding to the particular ADLP.

7. The system of claim 1, wherein the landing surface of at least one ADLP in the plurality of ADLPs is foldable or rollable into a compact state when not deployed on a flat surface.

8. The system of claim 1, wherein the ADPTMS memory further stores program instructions that when executed by the processing unit cause the processing unit to perform portions of an ADLP user registration procedure, wherein the system further comprises a plurality of user computing devices, each user computing device comprising hardware and software resources by which a user interacting with the user computing device can become a registered ADLP user authorized to use one or more ADLPs having database records stored in the database, wherein each user computing device is configured to execute an ADLP user management app by which the user computing device communicates with the ADPTMS during the ADLP user registration procedure, and wherein during the ADLP registration procedure corresponding to the user interacting with the user computing device the processing unit of the ADPTMS executes program instructions by which the ADPTMS:

establishes or verifies a unique user ID and password corresponding to the user;

identifies a plurality of ADLP addresses corresponding to the user, each ADLP address corresponding to an ADLP that the user is authorized to use and which has an ADLP record in the database;

receives user data including user contact information; and stores in the database an ADLP user record including the user ID, the user data, and the plurality of ADLP addresses corresponding to the user.

9. The system of claim 8, wherein the plurality of ADLP addresses corresponding to the user includes a current default ADLP address corresponding to a current default ADLP for aerial drone parcel delivery or pickup for the user, and at least one alternate ADLP address corresponding to at least one alternate ADLP for aerial drone parcel delivery or parcel pickup for the user.

10. The system of claim 9, further comprising at least one online store and an order management/fulfillment server associated with the at least one online store, wherein the at least one online store or the order management/fulfillment server is configured to communicate with the ADPTMS as part of an online order checkout procedure to associate a selected ADLP address stored within the database with an online order placed by a registered ADLP user in response to registered ADLP user input during the online order checkout procedure, wherein the selected ADLP address corresponds to a selected ADLP from among multiple ADLPs that the registered ADLP user is authorized to use for aerial drone parcel delivery or pickup.

11. The system of claim 1, wherein:

the ADLP record for each ADLP includes or links to adjunctive ADLP location data corresponding to the ADLP, wherein the adjunctive ADLP location data includes a set of reference image capture locations and a set of reference images, each reference image captured by an image capture device of an aerial drone along a previously successful flight path to the ADLP at a reference image capture location corresponding to the reference image;

the system further comprises a first aerial drone carrying a first image capture device, wherein the first aerial drone is configured for:

capturing a set of current in-flight images at a set of reference image capture locations corresponding to a target ADLP in the plurality of ADLPs along a current flight path to the target ADLP; and communicating each captured current in-flight image to an aerial drone service provider or the ADPTMS while traveling along the current flight path to the target ADLP; and the ADPTMS memory includes program instructions that when executed by the processing unit of the ADPTMS cause the ADPTMS to:

perform image processing operations by which objects, object outlines, structural details, and/or features in each current in-flight image captured at a particular reference image capture location along the current flight path to the target ADLP are compared with objects, object outlines, structural details, and/or features in a reference image captured at the particular reference image capture location; and generate an image match notification or an image mismatch notification based on the image processing operations to aid confirmation that the current flight path of the first aerial drone is correct and/or the first aerial drone is proximate to the target ADLP.

12. A method for managing aerial drone parcel deliveries and/or pickups, comprising:

providing a plurality of geographically distributed aerial drone landing pads (ADLPs), each ADLP comprising a landing surface configured for supporting a parcel containing merchandise, products, or goods (a) received from an aerial drone during parcel delivery form the aerial drone onto the landing surface of the ADLP, or (b) provided to the aerial drone during parcel pickup by the aerial drone from the landing surface of the ADLP, each ADLP having a control unit associated therewith configured for data communication with at least one of a computing device external to the ADLP and a set of data communication networks including the Internet, and each ADLP having a geolocation unit associated therewith configured for communication with the control unit and further configured for providing geolocation data indicating a two dimensional (2D) geospatial location of the ADLP as well as elevation data indicating an elevation at which the landing surface of the ADLP or the ADLP control unit resides during an ADLP registration procedure;

providing an aerial drone parcel transfer management server (ADPTMS) remote from the plurality ADLPs, the ADPTMS comprising processing unit and a memory storing program instructions;

performing for each of a first plurality of ADLPs within the plurality of ADLPs a first ADLP registration procedure comprising:

establishing data communication between the ADPTMS and the control unit corresponding to the ADLP by way of a set of data networks;

providing geolocation data from the control unit corresponding to the ADLP to the ADPTMS;

generating or receiving at the ADPTMS a unique ADLP address for the ADLP, the ADLP address comprising a unique identifier corresponding to the ADLP as well as the geolocation data provided by the geolocation unit corresponding to the ADLP;

determining a categorical type for the ADLP, which indicates that the ADLP is for private use; and storing in a database an ADLP record corresponding to the ADLP, wherein the ADLP record includes the unique ADLP address for the ADLP and the categorical type for the ADLP;

performing for each of a second plurality of ADLPs within the plurality of ADLPs a second ADLP registration procedure comprising:

establishing data communication between the ADPTMS and the control unit corresponding to the ADLP by way of a set of data networks;

providing geolocation data from the control unit corresponding to the ADLP to the ADPTMS;

generating or receiving at the ADPTMS a unique ADLP address for the ADLP, the ADLP address comprising a unique identifier corresponding to the ADLP as well as the geolocation data provided by the geolocation unit corresponding to the ADLP;

determining a categorical type for the ADLP, which indicates that the ADLP is for public use; and storing in a database an ADLP record corresponding to the ADLP, wherein the ADLP record includes the unique ADLP address for the ADLP and the categorical type for the ADLP; and for each ADLP within the first plurality of ADLPS, presenting a first Quick Response (QR) code on the landing surface of the ADLP, wherein the first QR code includes or encodes the unique identifier corresponding the ADLP, and wherein the first QR code is detectable, recognizable, and/or capturable by a particular aerial drone in association with parcel delivery from the particular aerial drone to the landing surface of the ADLP or parcel pickup by the particular aerial drone from the landing surface of the ADLP.

13. The method of claim 12, wherein the unique identifier corresponding to each ADLP (i) comprises as-manufactured information corresponding to the ADLP and is communicated by the control unit corresponding to the ADLP to the ADPTMS, or (ii) is generated by the ADPTMS and is communicated by the ADPTMS to the control unit corresponding to the ADLP, and wherein the method further comprises for each ADLP within the plurality of ADLPs:

generating the first QR code at the ADPTMS, wherein the first QR code includes or encodes the unique ADLP address for the ADLP;

communicating the first QR code from the ADPTMS to the ADLP; and presenting the first QR code on the landing surface of the ADLP following ADLP receipt thereof from the ADPTMS, wherein the first QR code is presented on the landing surface of the ADLP by way of an electronic display device having a display area, and wherein portions of the display area are surrounded by the landing surface of the ADLP.

14. The method of claim 13, further comprising:

establishing online communication between an online store and a registered user of a selected ADLP within the first plurality of ADLPs, wherein the database indicates that the registered user is authorized to use the selected ADLP;

receiving an online order at the online store indicating a parcel to be delivered to the registered user at the selected ADLP;

establishing communication between the online store and the ADPTMS;

generating a second QR code at the ADPTMS, wherein the second QR code includes or encodes data corresponding to the online order;

communicating the second QR code from the ADPTMS to the selected ADLP, and presenting the second QR code on the landing surface of the selected ADLP by way of the electronic display device while a particular airborne aerial drone carries the parcel toward the selected ADLP.

15. The method of claim 14, further comprising:

after receiving the online order indicating the parcel to be delivered to the registered user at the selected ADLP, receiving at the online store or the ADPTMS further communication from the registered user indicating parcel delivery to an alternate ADLP within the plurality of ADLPs instead of the selected ADLP, wherein the database indicates that the registered user is authorized to use the alternate ADLP;

generating a third QR code at the ADPTMS, which includes or encodes a unique ADLP address corresponding to the alternate ADLP comprising a unique identifier corresponding to the alternate ADLP, geolocation data corresponding to the alternate ADLP, and data corresponding to the online order;

communicating the third QR code from the ADPTMS to the alternate ADLP; and presenting the third QR code on the landing surface of the alternate ADLP by way of the electronic display device while the particular airborne aerial drone carries the parcel toward the alternate ADLP.

16. The method of claim 15, wherein the categorical type of the selected ADLP indicates that the selected ADLP is for private use, and the categorical type of the alternate ADLP indicates that the alternate ADLP is for public use.

17. The method of claim 15, wherein the categorical type of the selected ADLP indicates that the selected ADLP is for public use, and the categorical type of the alternate ADLP indicates that the alternate ADLP is for private use.

18. The method of claim 12, further comprising:

capturing by a particular airborne aerial drone en route to a selected ADLP a set of current in-flight images at a set of reference image capture locations along a current flight path of the particular aerial drone to the selected ADLP;

performing image processing operations by which objects, object outlines, structural details, and/or features in each current in-flight image are compared with object, object outlines, structural details, and/or features in a reference image captured during a previously successful aerial drone parcel delivery to the selected ADLP; and generating an image match notification or an image mismatch notification based on the image processing operations to aid confirmation that the current flight path of the particular aerial drone is correct and/or the particular aerial drone is proximate to the selected ADLP.

* * * * *